United States Patent
Najla et al.

(10) Patent No.: US 11,284,361 B2
(45) Date of Patent: Mar. 22, 2022

(54) SYSTEM AND METHOD FOR DEVICE-TO-DEVICE COMMUNICATION

(71) Applicants: Czech Technical University in Prague, Prague 6 - Dejvice (CZ); EURECOM, Biot Sophia Antipolis (FR)

(72) Inventors: Mehyar Najla, Prague (CZ); Zdenek Becvar, Prague (CZ); Pavel Mach, Prague (CZ); David Gesbert, Roquefort les Pins (FR)

(73) Assignees: Czech Technical University in Prague, Prague (CZ); EURECOM, Sophia Antipolis (FR)

( * ) Notice: Subject to any disclaimer, the term of this patent is extended or adjusted under 35 U.S.C. 154(b) by 0 days.

(21) Appl. No.: 16/919,990

(22) Filed: Jul. 2, 2020

(65) Prior Publication Data
US 2022/0007310 A1    Jan. 6, 2022

(51) Int. Cl.
*H04W 24/02* (2009.01)
*H04B 7/155* (2006.01)
*H04W 52/52* (2009.01)
*H04W 4/70* (2018.01)
*H04W 24/06* (2009.01)
(Continued)

(52) U.S. Cl.
CPC ............ *H04W 52/52* (2013.01); *G06N 20/00* (2019.01); *H04W 4/70* (2018.02); *H04W 24/06* (2013.01); *H04W 24/10* (2013.01); *H04W 92/18* (2013.01)

(58) Field of Classification Search
CPC ..... H04W 52/52; H04W 24/10; H04W 24/06; H04W 4/70; H04W 92/18; H04W 24/02; H04B 2001/0416; H04B 7/15578; H04B 17/13; G06N 20/00
See application file for complete search history.

(56) References Cited

U.S. PATENT DOCUMENTS

2009/0227217 A1*  9/2009  Tsuruoka ............. H03G 3/3042
                                                        455/127.2
2014/0274088 A1*  9/2014  Talwar ................ H04W 72/046
                                                        455/452.1
(Continued)

OTHER PUBLICATIONS

3GPP TR 36.843, "Study on LTE Device to Device Proximity Services; Radio Aspects," v12.0.1, Release 12, 2014, 50 pages.
(Continued)

*Primary Examiner* — Andrew Wendell
(74) *Attorney, Agent, or Firm* — Riverside Law LLP

(57) ABSTRACT

A method for device-to-device communication comprises providing a first communication device, a second communication device, and a plurality of base stations, measuring a first set of base station channel gains from the first communication device, measuring a second element of data from the second communication device, providing the first set of base station channel gains and the second element of data as inputs to an algorithm, calculating a D2D channel gain from the first set of base station channel gains and the second element of data with the machine learning algorithm, and adjusting at least one parameter based on the calculated D2D channel. A system for controlling device-to-device communication and a method of training a machine learning algorithm are also described.

26 Claims, 18 Drawing Sheets

(51) Int. Cl.
  *G06N 20/00* (2019.01)
  *H04W 24/10* (2009.01)
  *H04W 92/18* (2009.01)

(56) References Cited

U.S. PATENT DOCUMENTS

| | | | | |
|---|---|---|---|---|
| 2015/0156728 | A1* | 6/2015 | Kwon | H04W 52/242 370/329 |
| 2016/0174230 | A1* | 6/2016 | Benjebbour | H04W 52/346 370/329 |
| 2017/0038232 | A1* | 2/2017 | Kim | G07D 7/026 |
| 2018/0368133 | A1* | 12/2018 | Park | H04W 72/048 |
| 2020/0136680 | A1* | 4/2020 | Kim | H04B 7/0617 |

OTHER PUBLICATIONS

3GPP TS 36.211, "Evolved Universal Terrestrial Radio Access (E-UTRA); Physical channels and modulation," v13.5.0, Release 13, 2017 171 pages.
A. Ali, et al., "Estimating Millimeter Wave Channels Using Out-of-Band Measurements," Information Theory and Applications Workshop, pp. 1-6, 2016.
A. Ali, et al., "Millimeter Wave Beam-Selection Using Out-of-Band Spatial Information," IEEE Transactions on Wireless Communications, 17(2), pp. 140-146, 2017.
A. Gjendemsjo, et al.,"Binary Power Control for Sum Rate Maximization Over Multiple Interfering Links," IEEE Trans. on Wireless Commun., 7(8), pp. 3164-3173, 2008.
B.K. Chalise, et al., "Robust Uplink to Downlink Spatial Covariance Matrix Transformation for Downlink Beamforming," IEEE International Conference on Communications, 5, pp. 3010-3014, 2004.
D. Astely, et al., "LTE: The Evolution of Mobile Broadband," IEEE Communications Magazine, 47(4), pp. 44-51, 2009.
D. Ma, N. Wang, and X. Mu, "Resource Allocation for Hybrid Mode Device-to-Device Communication Networks," IEEE WCSP, 2016, 5 pages.
D. Marquardt, "An Algorithm for Least-Squares Estimation of Nonlinear Parameters," SIAM Journal on Applied Mathematics, 11(2), pp. 431-441, 1963.
D.M. Hawkins, "The Problem of Overfitting," Journal of chemical information and computer sciences, 44(1), pp. 1-12, 2004.
F. Jiang, et al., "Mode Selection and Resource Allocation for Device-to-Device Communications in 5G Cellular Networks," China Communications, 13(6), 32-47, 2016.
F.H. Khan, Y.J. Choi, and S. Bahk, "Opportunistic Mode Selection and RB Assignment for D2D Underlay Operation in LTE Networks," IEEE 79th Vehicular Technology Conference (VTC Spring), pp. 1-5, 2014.
J. Kim, S. Kim, J. Bang, and D. Hong, "Adaptive Mode Selection in D2D Communications Considering the Bursty Traffic Model," IEEE Communications Letters, 20(4), 712-715, 2016.
K. Hugl, et al., "Downlink Beamforming for Frequency Division Duplex Systems," IEEE Global Communications Conference (GLOBECOM), 4, pp. 2097-2101, 1999.
K. Hugl, et al., "Spatial Reciprocity of Uplink and Downlink Radio Channels in FDD Systems," Proc. COST, 273(2), p. 066, 2002, 7 pages.
L. Melki et al., "Interference Management Scheme for Network-Assisted Multi-Hop D2D Communications," IEEE PIMRC, pp. 1-5, 2016.
M. Arnold, et al., "Enabling FDD Massive MIMO through Deep Learning-based Channel Prediction," arXiv preprint arXiv:1901.03664, pp. 1-6, 2019.
M. Jordan, et al., "Conversion of the Spatio-Temporal Correlation from Uplink to Downlink in FDD Systems," IEEE Wireless Communications and Networking Conference, pp. 1-6, 2009.
M. N. Tehrani, et al., "Device-to-Device Communication in 5G Cellular Networks: Challenges, Solutions, and Future Directions," IEEE Communications Magazine, 52(5), pp. 86-92, 2014.
M. Najla, et al., "Machine Learning for Power Control in D2D Communication based on Cellular Channel Gains," in IEEE Global Communications Conference Workshop on Machine Learning for Wireless Communications, 2019, 6 pages.
M.T. Hagan, "Training Feed-Forward Networks With The Marquardt Algorithm," IEEE Transactions on Neural Networks, 5(6), pp. 989-993, 1994.
N. Gonzalez-Prelcic, et al., "Millimeter-Wave Communication With Out-of-Band Information," IEEE Communications Magazine, 55(12), pp. 1038-1052, 2017.
P. Dong, et al., "Machine Learning Prediction Based CSI Acquisition for FDD Massive MIMO Downlink," IEEE Global Communications Conference (GLOBECOM), pp. 1-6, 2018.
P. Mach, et al., "In-band Device-to-Device Communication in OFDMA Cellular Networks: A Survey and Challenges," IEEE Communications Surveys & Tutorials, vol. 17, No. 4, pp. 1885-1922, 2015.
P. Mach, et al., "Mobile Edge Computing: A Survey on Architecture and Computation Offloading," IEEE Communications Surveys & Tutorials, 19(3), pp. 1628-1656, 2017.
P. Mach, Z. Becvar, and M. Najla, "Combined Shared and Dedicated Resource Allocation for D2D communication," accepted to IEEE VTC-Spring, 2018, 7 pages.
P. Mach, Z. Becvar, and M. Najla, "Resource Allocation for D2D Communication with Multiple D2D Pairs Reusing Multiple Channels," IEEE Wireless Communications Letters, 8(4), pp. 1008-1011, 2019.
R. AliHemmati, et al., "Multi-Channel Resource Allocation Toward Ergodic Rate Maximization for Underlay Device-to-Device Communications," IEEE Transactions on Wireless Communications, 17(2), pp. 1011-1025, 2017.
R. AliHemmati, et al., "Power Allocation for Underlay Device-to-Device Communication over Multiple Channels," IEEE Transactions on Signal and Information Processing over Networks, 4(3), pp. 467-480, 2018.
R. Deng, et al., "A Two-Step Learning and Interpolation Method for Location-based Channel Database Construction," IEEE Global Communications Conference (GLOBECOM), pp. 1-6, 2018.
R. Wang, et al. "Qos-Aware Joint Mode Selection and Channel Assignment for D2D Communications," IEEE International Conference on Communications (ICC), pp. 1-6, 2016.
R. Yin, et al., "Joint Spectrum and Power Allocation for D2D Communications Underlaying Cellular Networks," IEEE Transactions on Vehicular Technology, 65(4), pp. 2182-2195, 2016.
S. Lin, et al., "Sum-rate optimization for Device-to-Device communications over Rayleigh fading channel," IEEE VTC Spring, pp. 1-6, 2017.
S. Shamaei, et al., "Interference Management in D2D-Enabled Heterogeneous Cellular Networks Using Matching Theory," IEEE Transactions on Mobile Computing, 18(9), pp. 2091-2102, 2018.
S.M.A. Kazmi, et al., "Mode selection and Resource Allocation in Device-to-Device Communications: A Matching Game Approach," IEEE Transactions on Mobile Computing, 16(11), pp. 3126-3141, 2017.
T. Aste, et al., "Downlink Beamforming Avoiding DOA Estimation for Cellular Mobile Communications," IEEE International Conference on Acoustics, Speech, and Signal Processing, 6, pp. VI-3313, 1998, 5 pages.
T. D. Hoang et al., "Energy-Efficient Resource Allocation for D2D Communications in Cellular Networks," IEEE Transactions on Vehicular Technology, 65(9), pp. 6972-6986, 2016.
T. Huynh, at al., "Joint Downlink and Uplink Interference Management for Device-to-Device Communication Underlaying Cellular Networks," IEEE Access, 4, pp. 4420-4430, 2016.
W. Lee, et al., "Deep power control: Transmit power control scheme based on convolutional neural network," IEEE Communications Letters, 22(6), pp. 1276-1279, 2018.
X. Li, et al., "Resource allocation for underlay D2D communication with proportional fairness," IEEE Transactions on Vehicular Technology, 67(7), pp. 6244-6258, 2018.

(56) References Cited

OTHER PUBLICATIONS

Y. Gu, et al., "Matching and Cheating in Device-to-Device Communications Underlying Cellular Networks," IEEE Journal on Selected Sreas in Communications, 33(10), pp. 2156-2166, 2015.

Y. Huang, et al., "Mode Selection, Resource Allocation, and Power Control for D2D-Enabled Two-Tier Cellular Network," IEEE Transactions on Communications, 64(8), pp. 3534-3547, 2016.

Y. Li, M.C. Gursoy, and S. Velipasalar, "Joint Mode Selection and Resource Allocation for D2D Communications under Queueing Constraints," IEEE Infocom Workshop, 2016, 6 pages.

Y. Qian, T. Zhang, and D. He, "Resource Allocation for Multichannel Device-to-Device Communications Underlaying QoS-Protected Cellular Networks," IET Communications, 11(4), pp. 558-565, 2017.

Y.C. Liang, et al., "Downlink Channel Covariance Matrix (DCCM) Estimation and Its Applications in Wireless DS-CDMA Systems," IEEE Journal on Selected Sreas in Communications, 19(2), pp. 222-232, 2001.

YD. Bultitude et al., "T. IST-4-027756 WINNER II D1. 1.2 V1.2 WINNER II Channel Models," Tech. Rep., Tech. Rep. 2007, 82 pages.

Z. Chu, et al., "Low-Latency Driven Energy Efficiency for D2D Communications," IEEE ICC, pp. 1-6, 2019.

\* cited by examiner

SYSTEM AND METHOD FOR DEVICE-TO-DEVICE COMMUNICATION

BACKGROUND OF THE INVENTION

In device-to-device (D2D) communication, data is transmitted over a direct link between a pair of nearby user equipment (UEs) instead of being relayed via a base station (BS). Conventionally, D2D pairs can exploit two communication modes: shared and dedicated. In shared mode, the D2D pairs reuse the same radio resources as cellular users (CUEs) that send data through the BS. D2D pairs in dedicated mode are allocated with resources that are orthogonal to the resources of CUEs.

An efficient exploitation of a D2D network often entails challenging radio resource management (RRM) problems, including selection between shared and dedicated modes, interference management to/from CUEs, channels, and power allocation. Conventional algorithms addressing the above RRM problems in D2D networks assume a prior estimation of D2D channel gains (i.e., channel gains among all UEs involved in D2D). In some instances, the full knowledge requirement can be relaxed to a partial knowledge requirement, where only knowledge of a subset of the distributed D2D channel gains is required (e.g., in W. Lee, et al., "Deep power control: Transmit power control scheme based on convolutional neural network," *IEEE Communications Letters*, 22(6), pp. 1276-1279, 2018, incorporated herein by reference). Nevertheless, even partial knowledge of D2D channel gains implies a substantial cost in terms of an additional signaling overhead on top of the one generated in classical cellular communications. In fact, the base station channel gains (i.e., channel gains between the UEs and the BSes) are typically estimated by default as these are needed for handover as well as user attachment, authorization, and classical cellular communication purposes. More precisely, even users that wish to engage in D2D communications must be recognized by the network and thereby their base station channel gains must be estimated initially. Thus, these base station channels are periodically reported to the BSes, and can be leveraged at no additional signaling overhead. An interesting question then arises as to whether the by-default base station channel gains carry information that is relevant to D2D communication and could help (for free) to solve the D2D resource management problems.

The idea set forth in this disclosure is that, while the base station channel gains should exhibit fading coefficients that are known to be independent of those measured on the direct channels among the UEs, there actually exists common information between these data at the statistical level. One illustrative example assumes a green-field (free space) propagation scenario, in which the location of all UEs is made available to the network, even for those devices not interested in communicating with the network. In this scenario, both cellular and D2D channel gains are predictable from the UEs' locations and the use of a deterministic free-space channel model with line of sight (LOS) among all entities. Therefore, in a LOS environment, both D2D and base station channel gains directly relate to each other via the user location knowledge. In practice, however, UEs' locations may not be known due to privacy issues or simply may not be available. More importantly, in non-line of sight (NLOS) scenarios (such as suburban or urban areas), D2D channels or base station channels may be obstructed by outside factors, including but not limited to buildings, vehicles, geographic features, or the like. For example, two devices might experience a strong LOS D2D channel while a building or other obstacle may block the base station channel between one or both of the devices and a given BS, thus making the D2D and base station channel gains less related than in a pure LOS scenario. In this disclosure, it is shown that, in contrast to initial belief, a strong relationship can be calculated between the cellular and the D2D channels in a NLOS scenario, and can be made even stronger by leveraging cellular measurements from additional surrounding BSes.

Existing channel prediction works typically focus on predicting the channel quality between a single UE and an antenna at the BS at a specific frequency based on one of i) knowing the channel between this UE and the BS antenna at another frequency, or ii) knowing the channel between this BS antenna and another UE that is close to the original UE, or iii) knowing the channel between this UE and another close-by antenna at the same BS. However, no existing system is able to predict D2D channel gains based on the base station channel gains. Thus, there is a need in the art for a system for predicting D2D channel gains based on base station channel gains from BSes. The present invention satisfies this need.

SUMMARY OF THE INVENTION

In one aspect, a method for device-to-device communication comprises providing a first communication device, a second communication device, and a plurality of base stations, measuring a first set of base station channel gains from the first communication device, the first set of base station channel gains corresponding to a first subset of the plurality of base stations, measuring a second element of data from the second communication device, providing the first set of base station channel gains and the second element of data as inputs to an algorithm, calculating a D2D channel gain from the first set of base station channel gains and the second element of data with the machine learning algorithm, adjusting at least one parameter based on the calculated D2D channel, the parameter selected from the group consisting of transmit power, an interference management parameter, scheduling, modulation, coding scheme selection, handover decision, or relay selection, and initiating communication between the first and second communication devices.

In one embodiment, the second element of data comprises the location of the second communication device. In one embodiment, the second element of data comprises a second set of base station channel gains corresponding to a second subset of the plurality of base stations. In one embodiment, the method further comprises transmitting the first set of base station channel gains and the second element of data to a computation server. In one embodiment, the algorithm is a machine learning algorithm. In one embodiment, the machine learning algorithm is executed on a processor of a computation server. In one embodiment, the machine learning algorithm is a deep neural network. In one embodiment, the deep neural network has between 4 and 6 hidden layers.

In one embodiment, the method further comprises the steps of providing a first updated set of base station channel gains as an input to the algorithm after a fixed time interval, providing a second updated element of data as an input to the algorithm after the fixed time interval, recalculating the D2D channel gain from the first updated set of base station channel gains and the second updated element of data with the algorithm, and initiating communication between the first and second communication devices using the recalculated D2D channel.

In one embodiment, the fixed time interval is less than 100 ms. In one embodiment, the method further comprises using the calculated D2D channel gain for a communication management task selected from the group consisting of radio resource management, network resource management, radio link control, or mobility management.

In one aspect, a system for controlling device-to-device communication comprises at least one base station connected to a communication network, a computing device communicatively connected to the communication network, the computing device comprising a processor and a non-transitory computer-readable medium with instructions stored thereon, which when executed by the processor perform steps comprising receiving a first set of base station channel gains from a first communication device, receiving a second element of data from a second communication device, providing the first set of base station channel gains and the second element of data as an input to an algorithm, calculating a D2D channel gain from the input with the algorithm, and providing the D2D channel gain to a second computing device configured to manage radio resources of the communication network.

In one embodiment, the second element of data comprises the location of the second communication device. In one embodiment, the second element of data comprises a second set of base station channel gains corresponding to a second subset of the plurality of base stations. In one embodiment, the computing device is selected from the group consisting of the first communication device and the second communication device. In one embodiment, the computing device is further connected to at least one additional base station in the communication network. In one embodiment, the algorithm is a machine learning algorithm. In one embodiment, the machine learning algorithm is a deep neural network.

In one embodiment, the deep neural network has between 4 and 6 hidden layers. In one embodiment, the instructions further performing the steps of receiving at least one additional set of base station channel gains from at least one additional communication device, determining at least one additional D2D pair of communication devices, selected from the first, second, and at least one additional communication devices, providing data selected from the group consisting of the first and at least one additional base station channel gains and the second element of data as a second input to the algorithm, calculating a second D2D channel gain with the algorithm, and providing the second D2D channel gain to the second computing device.

In one embodiment, the communication network is a cellular communication network selected from the group consisting of a WiFi, Bluetooth, a 3G, 4G, and 5G cellular network. In one embodiment, the second computing device is selected from the group consisting of a base station, a UE, a server, a cloud server, and an edge server.

In one aspect, a method of training a machine learning algorithm comprises providing a first computing device, collecting first and second sets of base station channel gains from first and second communication devices, providing a target channel gain between the first and second communication devices, and training a machine learning algorithm on the first computing device with the base station channel gains and the target channel gain.

In one embodiment, the method further comprises creating a digital representation of a target area, including locations of a plurality of simulated base stations, selecting two random points in the digital representation of the target area as the locations of first and second simulated communication devices, calculating simulated base station channel gains for each of the first and second simulated communication devices from the plurality of simulated base stations, calculating a simulated optimal channel gain between the first and second simulated communication devices, and providing the first and second simulated base station channel gains and the simulated optimal channel selection as the base station channel gains and the target channel gain, respectively, to train the machine learning algorithm.

In one embodiment, the method further comprises measuring first and second sets of base station channel gains observed by the first and second communication devices, communicatively connecting the first and second communication devices in D2D communication using a D2D channel, and providing the first and second measured sets of base station channel gains and the D2D channel as the base station channel gains and target channel gain, respectively, to train the machine learning algorithm.

In one embodiment, the method further comprises forming a first (sample, result) pair from the simulated base station channel gains and the target channel selection, calculating a set of additional (sample, result) pairs from a plurality of additional simulated communication devices having locations at other random points in the digital representation, and training the machine learning algorithm with the set of additional (sample, result) pairs.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION

Figure 1:
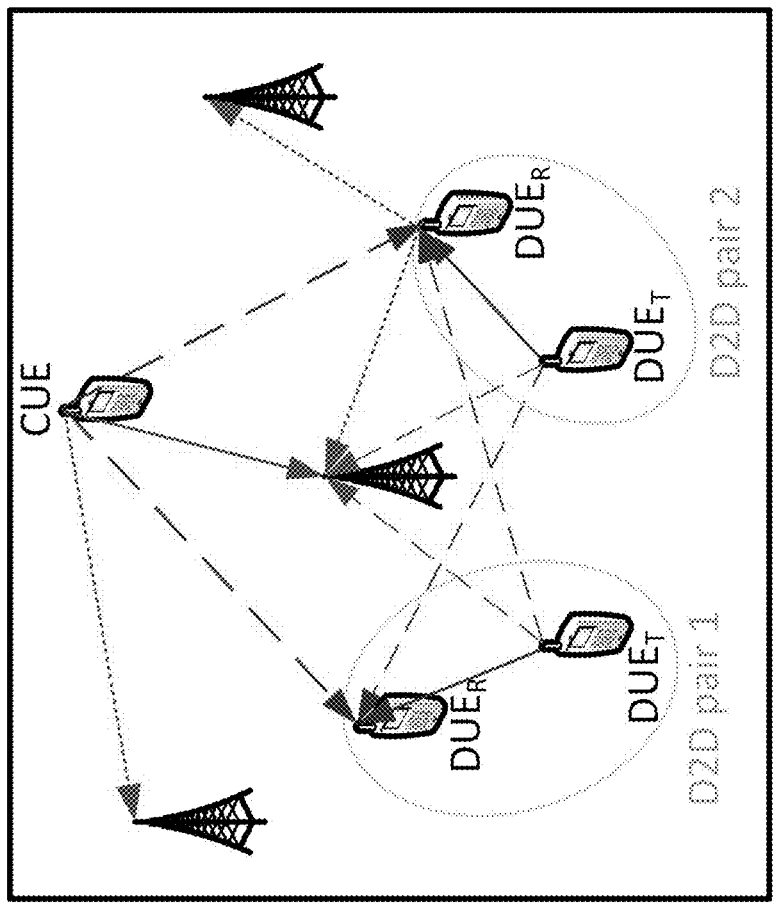
FIG. 1 is a diagram of a system model as disclosed herein.
Figure 1:
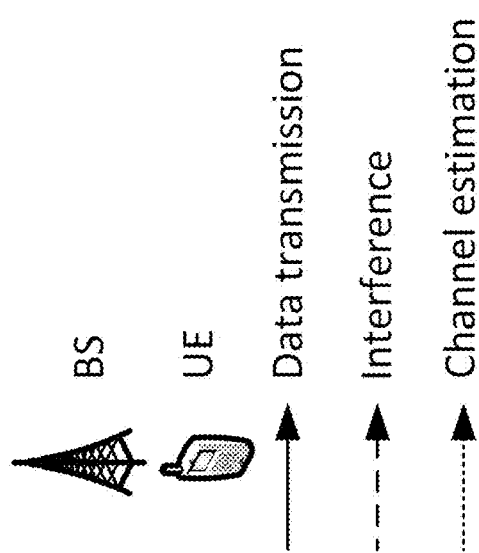

It is to be understood that the figures and descriptions of the present invention have been simplified to illustrate elements that are relevant for a clear understanding of the present invention, while eliminating, for the purpose of clarity, many other elements found in related systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C#, Objective-C, Java, JavaScript, MATLAB, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G, 4G/LTE, or 5G networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

As used herein, the terms "base station gain" or "base station channel gain" refers to a gain or signal quality measurement related to a communication link between a communication device and a base station. In one embodiment, the gain measurement comprises the gain measured at the communication device of the signal received from the base station. In another embodiment, the gain measurement comprises the gain measured at a base station of a signal received from a communication device. For example, cellular transceivers typically collect and track signal information (for example, Received Signal Strength (RSS), Signal to Interference Plus Noise (SINR), Reference Signal Received Power (RSRP), and Reference Signal Received Quality (RSRQ) received from all base stations whose signals they receive, in order to make decisions, for example handover of a movable communication device from one base station to another.

This disclosure relates to a method of using a computer algorithm, for example a machine learning approach based on a deep neural network (DNN) which is configured to calculate one or more D2D gains from one or more base station channel gains, for example signal gains measured from nearby BSes. In some embodiments, the set of base station channel gains constitutes an order-of-magnitude smaller dimensional object than the D2D channels being predicted (i.e., there are just X base station channel gains for one cell with X users in it, in contrast to X(X−1) direct and interference D2D gains). Hence, the proposed approach not only requires information that is easier to obtain (base station channel estimation) rather than the more difficult D2D channel gains for the optimization of D2D communications, but it also promises substantial savings in signaling for the channel estimation. Although some examples are described using a DNN for calculating D2D gains, it is understood that in other embodiments any algorithm may be used, including but not limited to a linear regression algorithm, a polynomial regression algorithm, a support vector regression (SVR) algorithm, a decision tree, or any neural network or machine learning algorithm suitable to solve a targeted regression task.

Aspects of the invention relate to device-to-device communication, and may be presented in view of specific examples, for example smartphones or handheld devices. However, it is understood that the systems and methods herein may be used for communication among any communication-enabled devices, including but not limited to vehicles, drones, fixed relays, implants, Internet of Things (IoT) devices, or the like. Therefore, the terms "device," "communication device," and "user equipment" as used herein may refer to any communication-enabled devices as listed or otherwise as would be understood by one skilled in the art.

Aspects of the invention relate to a machine learning algorithm, machine learning engine, or neural network. A neural network may be trained based on various attributes of a network of devices and may output one or more D2D channel gains or radio resource management-related decisions, including but not limited to transmit power, an interference management parameter, scheduling, modulation, coding scheme selection, handover decision, or relay selection. In some embodiments, attributes may include the BS channel gains measured by each of the devices, the BS channel gains measured by one or more devices, and/or information on the position of one or more additional devices, and/or one or more configuration parameters of some or all of the devices. The resulting predicted D2D channel gain or radio resource management-related decision may then be judged according to one or more quality metrics or loss functions, and the weights of the attributes may be optimized to maximize those quality metrics or minimize those loss functions. In this manner, a neural network can be trained to predict and optimize any quality metric or loss function that can be experimentally measured or calculated from simulations. Examples of quality metrics that a neural network can be trained on include data error rate, throughput, energy efficiency and any other suitable type of quality metric that can be measured. In some embodiments, the neural network may have multi-task functionality and allow for simultaneous prediction and optimization of multiple quality metrics.

In embodiments that implement such a neural network, a query may be performed in various ways. A query may request the neural network to identify a D2D transmit power or channel to increase a desirable parameter, for example, the total throughput or energy efficiency of the network, or to minimize one or more individual parameters, including but not limited to the data error rate.

In some embodiments, the neural network may be updated by training the neural network using a known good value of the desirable parameter associated with an input D2D pair. Updating the neural network in this manner may improve the ability of the neural network in proposing optimal transmit power or channel. In some embodiments, training the neural network may include using a value of the desirable parameter associated with a known optimal or desirable radio resource management-related decision, for example the D2D pairs transmit powers, which, for example, maximizes the network throughput. In some embodiments, training the neural network may include using the desired true/real D2D channel gain that the neural network is being trained to predict. For example, in some embodiments, training the neural network may include predicting a value of the desirable parameter for the proposed D2D pair, comparing the predicted value to the corresponding desired or true value associated with a known D2D pair, and training the neural network based on a result of the comparison. Based on the considered loss function that defines how much the predicted value differs from that of the known radio resource management-related decision and/or channel selection of the D2D pair, the neural network may be substantially updated to better correct for this discrepancy. The neural network may be updated based on backpropagation with an existing neural networks optimization algorithm (e.g., Levenberg-Marquardt, stochastic gradient descent, Adam, etc.). Regardless of how the neural network is being trained, the neural network training may continue to propose additional transmit powers and/or channels.

Although the techniques of the present application are in the context of setting a transmit power or selecting a channel for D2D communication, it should be appreciated that this is a non-limiting application of these techniques as they can be applied to other types of parameters or attributes, for example resource allocation, relay selection, communication mode selection, and interference estimation and management.

Querying the neural network may include inputting initial data points, for example the results of simulations of a target area, including approximate dimensions of one or more fixed obstacles and the locations of one or more base stations in the area. In one embodiment of a simulated digital representation of a target area, two random points are generated as the locations of two devices. The communication channels between every device and a set of surrounding base stations are calculated based on the uplink/downlink statistical channel gain models suitable for the target area. The D2D channel between the two devices is also calculated based on the D2D statistical channel gain models suitable for the target area. The measured base station channel gains (presenting features) and their corresponding D2D channel gains (presenting the targets) are used to train the deep neural network (or any other machine learning tool), for example following any known way used to train any supervised learning-based neural network.

The neural network may be trained using different inputs. A query to the neural network may be for a radio resource management-related decision including, but not limited to, a transmit power and/or a D2D channel gain. A radio resource management-related decision including, but not limited to, a transmit power and/or a D2D channel gain may be received from the neural network in response to the query.

In some embodiments, the neural network or other machine learning tool may be trained, alternatively or additionally with real data (i.e., real measurements of base station channel gains of two devices and the corresponding D2D gain between these two devices) if such data is available.

The techniques described herein may be associated with iteratively querying a neural network by inputting a set of received base station channel gains, receiving an output from the neural network including a transmit power, channel, or other resource-management related decision, then comparing the result to a known optimal or ideal result given the inputted base station channel gains. The difference between the known result and the output result may then be used to provide performance parameters of the neural network or other machine learning application, for example adjusting one or more weightings.

Disclosed herein is a novel framework for calculating D2D channel gains based on measured base station channel gains in order to solve various problems related to radio resource management in D2D communication without incurring the pilot overhead that is usually expected in D2D communication. Although in some embodiments, methods disclosed herein involve calculating D2D channel gains between a first communication device and a second communication device based on the base station channel gains measured at the first device and the second device, in other embodiments base station channel gains from additional devices, up to and including all devices within range of the base stations, may be collected as inputs to the system for calculating base station channel gains. In some embodiments, location, for example GPS location, may be used in addition to or in place of the base station channel gains in calculating the D2D channel gains.

The systems and methods disclosed herein used a DNN to build up a regression model connecting the base station channel gains (as DNN inputs) to the D2D channel gains (as DNN outputs). The DNN may in some embodiments be trained offline via simulations of the targeted area. Thus, the training samples (cellular and D2D channel gains) were collected based on simulations and then, used to train the DNN. The disclosed experimental examples show a high convergence between the true and the predicted D2D channel gains, even in typical urban NLOS scenarios.

The signaling overhead was analyzed in terms of the number of channel gains needed to implement the radio resource management algorithms with and without the disclosed DNN-based D2D channel gain prediction scheme to show the benefits of the disclosed concept.

Finally, the robustness of the disclosed scheme was demonstrated against environment changes and possible inaccuracies in the simulations of the targeted area during the offline training.

Prediction Methods

The present disclosure aims to predict the real (true) channel gain $g_{i,j}$ between any i-th and j-th UEs, that can be exploited for any existing RRM algorithms. A goal of the prediction algorithm is to minimize the prediction error. The problem is formulated as:

$$\min_{g^*_{i,j}}(g_{i,j} - g^*_{i,j})^2 \qquad \text{Equation 1}$$

where $g_{i,j}^*$ is the predicted channel gain between the i-th and the j-th UEs. In the disclosed model, the only available information about each UE is the base station channel gains, and so this information is exploited yo predict the channel gain between any two UEs. The methods disclosed herein demonstrate a novel DNN-based scheme for the prediction of $g_{i,j}$ relying on the knowledge of the base station channel gains of the i-th and the j-th UEs.

In the following sections, the novel DNN-based scheme of the present disclosure is described, including the architecture and training process for the DNN.

Figure 2A:
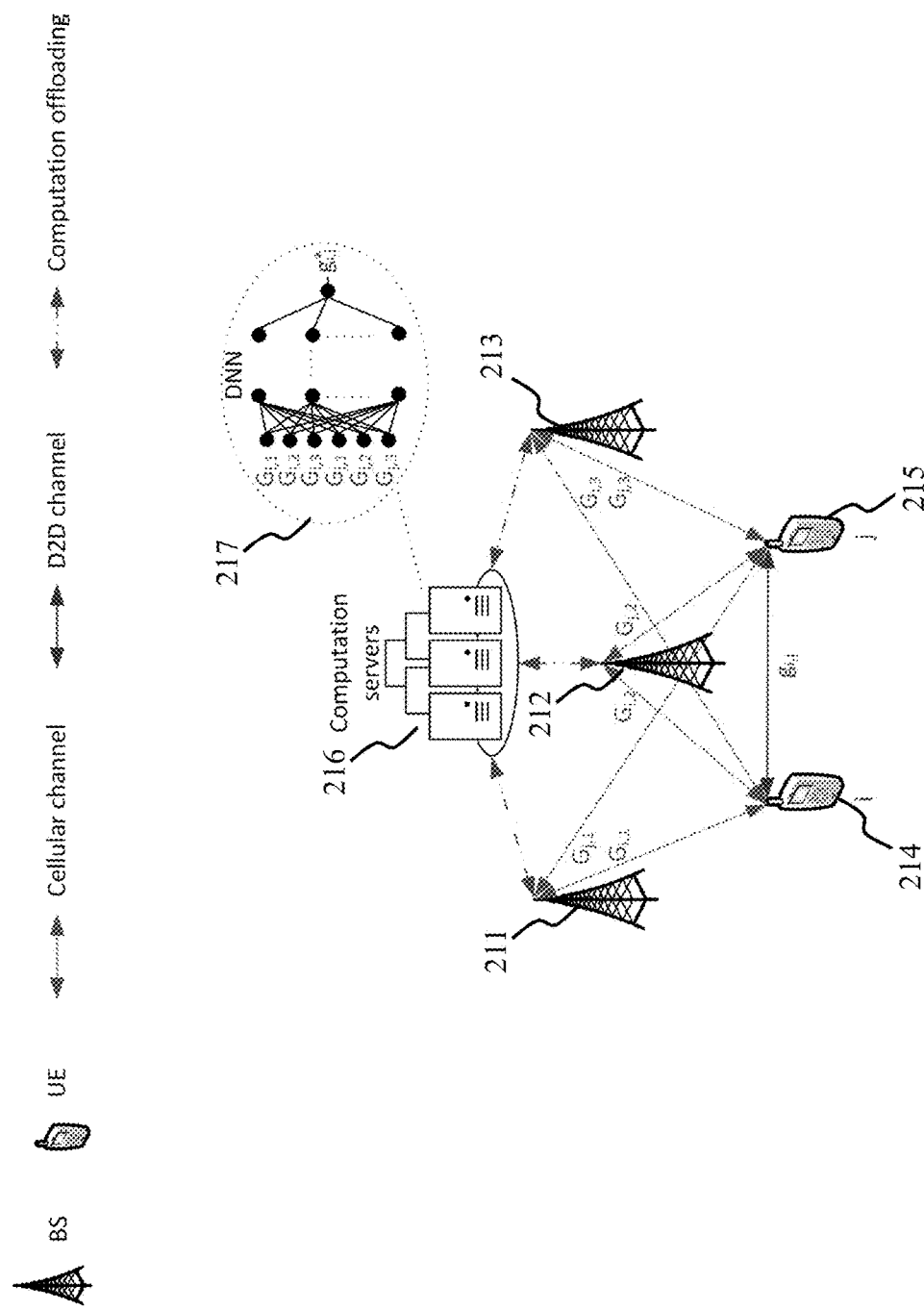
FIG. 2A, FIG. 2B, and FIG. 2C are diagrams of a system model as disclosed herein.
Figure 2B:
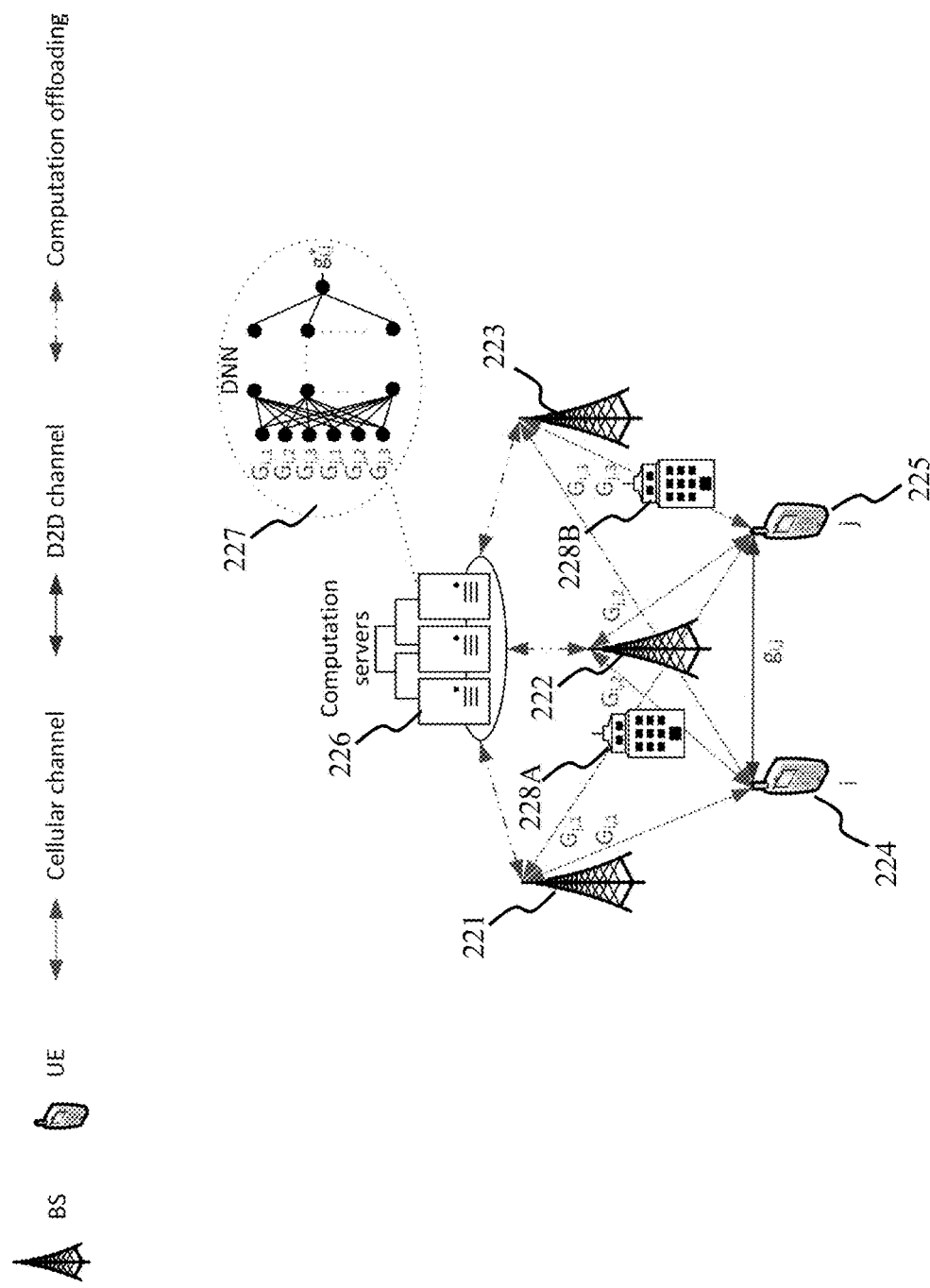
Figure 2C:
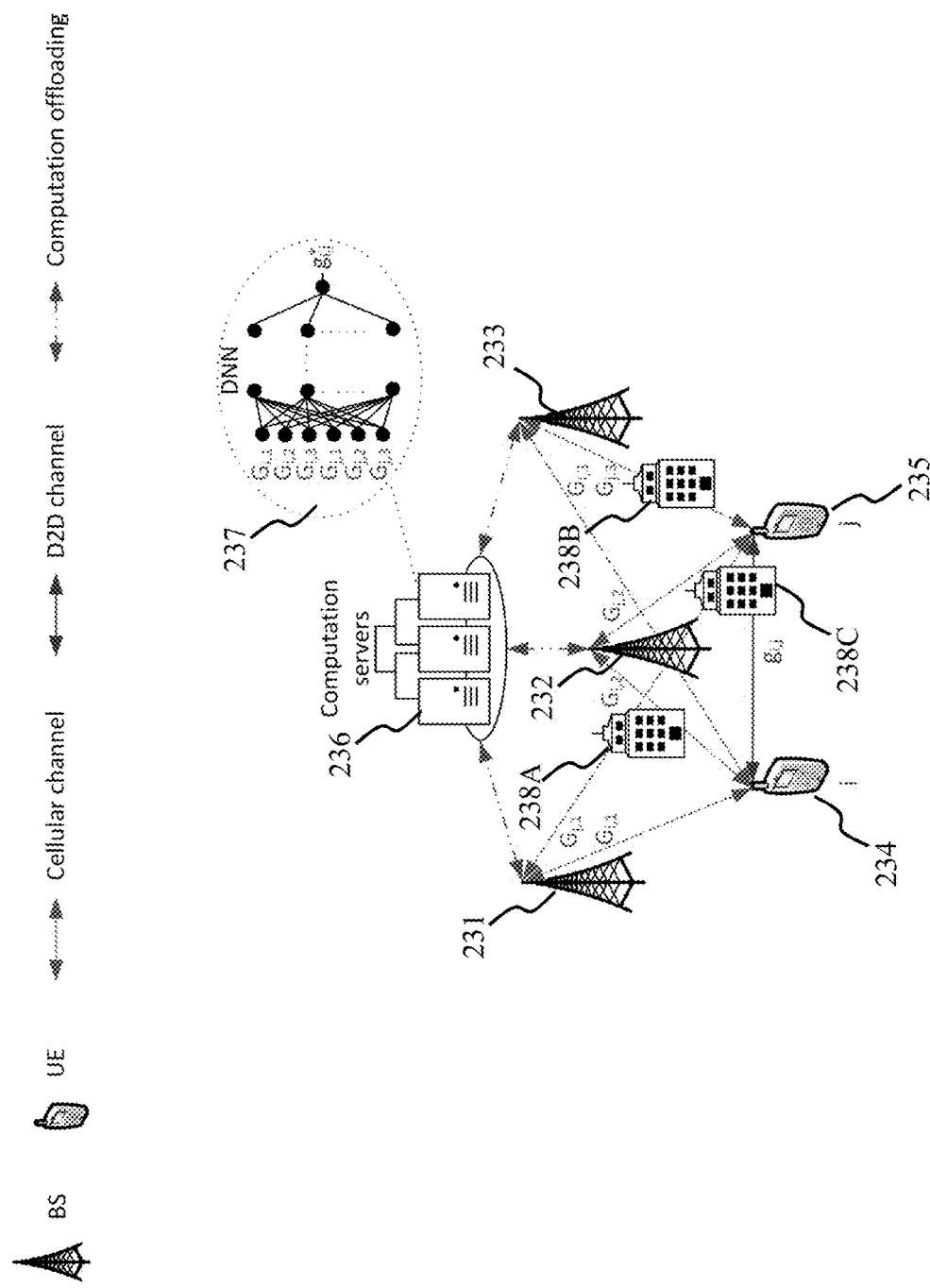

In a green-field (free space) propagation scenario, in which the location of all UEs is made available to the network, both the cellular and the D2D channel gains are easily predictable from the UEs' locations. In the free space area with LOS, the base station channel from the UE to at least three BSes corresponds to a single specific location of the UE. Consequently, the D2D channel gain value between two UEs can be easily predicted. Such an example is shown in FIG. 2A, where UEs 214 and 215 have no obstructions between them or between either of them and BSes 211, 212, and 213. However, such ideal scenarios are unrealistic, and in practice UEs' locations may not be known due to privacy issues or may not otherwise be available. Moreover, in NLOS (urban or suburban) scenarios, the D2D channels and the base station channels may be obstructed by outside factors, and the D2D channel prediction from the UEs' locations seems to be impossible. For example, as shown in FIG. 2B, two devices 224 and 225 might experience a strong LOS D2D channel between one another, while a buildings 228A and 228B obstruct the base station channel between one of these devices (or more) and one or more BSes. A more complicated NLOS scenario is shown in FIG. 2C, wherein not only do buildings 238A and 238B obstruct the LOS between each of UEs 224 and 225 and one of the BSes, but building 238C additionally obstructs the D2D LOS between UEs 234 and 235. In such a case, the D2D channel gain between the two UEs might be hard to predict from the measured base station channel gains. However, increasing the number of known base station channel gains from each UE (for example by adding more BSes to the system in the vicinity of the UEs) leads to a higher confidence related to the UE's location and provides information about the position (and shape) of obstructing elements of the terrain. This information can then be mapped into a cartography of D2D gains.

In some embodiments, the problem can be expressed by Equation 2 below—given a specific area with certain topology, terrain, buildings, there exists a mapping F connecting the base station channel gains of the existing UEs (denoted as $G^C$) and the D2D channel gains among these UEs (denoted as g) so that:

$$g=F(G^C) \qquad \text{Equation 2}$$

Solving the problem in Equation 1 can be achieved by approximating the function F from Equation 2. However, this approximation is difficult because the size of $G^C$ and g changes when the number of UEs changes. In other words, a different function F needs to be approximated for every possible number of UEs making one unified solution unrealistic. Therefore, taking into account the problem defined in Equation 1, the disclosed system circumvents this problem by approximating the mapping F between $G_{i,j}^C$ and $g_{i,j}$ where $G_{i,j}^C = \{G_{i,1}, \ldots G_{i,L}, G_{j,1}, \ldots G_{j,L}\}$ and includes the gains of the base station channels from L BSes to any i-th and j-th UEs. Therefore, regardless of the number of UEs in the system, the D2D channel between any two UEs can be predicted by knowing the gains of the base station channels from these two UEs and the surrounding BSes. hence, the problem in Equation 1 can be rewritten as Equation 3 below:

$$\min_{F}(g_{i,j} - F(G_{i,j}^C))^2 \qquad \text{Equation 3}$$

By approximating F, Equation 3 aims to minimize the difference between the true and predicted gains of the D2D channel between any i-th UE and j-th UE; based on the knowledge of the base station channel gains measured at the two UEs in the pair.

As described herein, one aspect of the present invention exploits a machine learning tool, which may in some embodiments be a DNN, to predict $g_{i,j}$ based on $G_{i,j}^C$.

With reference to FIG. 2, in conventional cellular communication systems, the base station channel gains between a given UE (for example 214) and the surrounding BSes (211, 212, 213) are periodically reported to the BSes for purposes related to the conventional communication and/or handover. In some mobile networks, some network computations are offloaded to powerful computation servers 216, reducing network's energy consumption. Therefore in some embodiments the proposed machine learning tool 217 can be deployed on computation servers 216 which are connected to BSes 211, 212, 213. The servers 216 may be configured to collect the estimated base station channel gains (purple dash-dotted lines in FIG. 2) and calculate the predicted gain/channel of $g_{i,j}$. The actual base station channel gains measured at each UE are represented by blue dashed lines in FIG. 2. In various embodiments, computing devices performing the processing steps of the methods described herein can be located at any unit or entity in the network, including but not limited to at one or more base stations, in the core network, or on one or more UEs. In one embodiment, an edge computing server can be exploited. In another embodiment, the computation may be distributed across a plurality of devices with the results gathered and distributed from one central device. As would be understood by one skilled in the art, in conventional architectures of mobile networks (e.g., 3G, 4G, 5G), edge computing brings computing power to the edge of the network where potential radio resource management algorithms can be run. In some embodiments, the computing device or devices calculating the prediction models should be located as close as possible to the place where the radio resource management is performed, in order to avoid adding delay to the radio resource management.

Architecture

Figure 3:
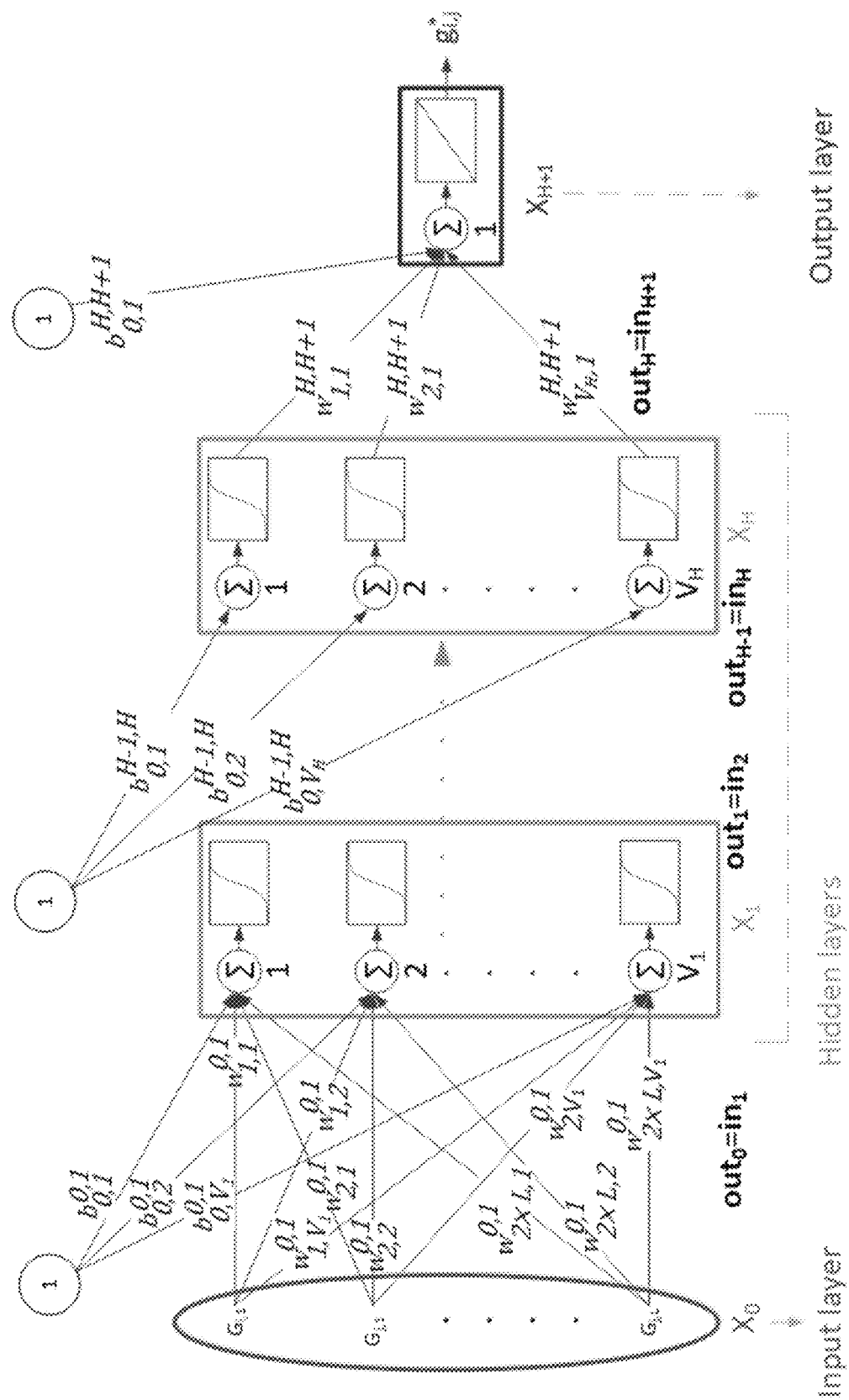
FIG. 3 is a diagram of a deep neural network.

In one exemplary embodiment, the D2D channel gain between the i-th and the j-th UEs based on the base station channel gains from both the i-th and j-th UEs to the L BSes may be calculated by a deep neural network designed to build the regression model. FIG. 3 shows a diagram of the disclosed fully-connected DNN. The proposed DNN is composed of an input layer ($X_0$), H hidden layers ($X_1, \ldots, X_H$) and an output layer ($X_{H+1}$). The input layer contains the base station channel gains between the i-th UE and the L BSes and between the j-th UE and the L BSes (i.e., $G_{i,j}^C$) aligned as an input vector in the input layer as illustrated in FIG. 3. Thus, the output of the input layer $out_0$ is the base station channel gains vector $G_{i,j}^C = \{G_{i,1}, \ldots G_{i,L}, G_{j,1}, \ldots G_{j,L}\}$ of length 2×L. The DNN contains H hidden layers, each hidden layer $X_h$ composed of $V_h$ neurons. Every hidden layer $X_h$ has an input vector $in_h$ equivalent to the output of the previous layer $out_{h-1}$ (i.e., $in_h = out_{h-1}, \forall h \in \{1, \ldots, H\}$). Each input element z in $in_h$ is fed to every neuron v in the hidden layer $X_h$ with a weight $w_{z,v}^{h-1,h}$. Consequently, every neuron v performs a dot product between the input elements in $in_h$ and the corresponding weights. The result of the dot product is added to a corresponding bias $b_{0,v}^{h-1,h}$ and processed by the sigmoid function giving the output of the neuron. Hence, the hidden layer $X_h$ with $V_h$ neurons and input vector $in_h$ gives an output vector $out_h$ of the length $V_h$ and this output vector $out_h$ is, thus, written as:

$$out_h = Sig(W^{h-1,h} in_h + b^{h-1,h}) = Sig(W^{h-1,h} out_{h-1} + b^{h-1,h}) \quad \text{Equation 4}$$

$$Sig(Z) = \frac{1}{1+e^{-Z}}$$

where $W_{h-1,h}$ is the matrix of weights of the links between every input element of $X_h$ (i.e., equivalent to the output of $X_{h-1}$) and every neuron in $X_h$ and $b^{h-1,h}$ is the vector of biases attached to the neurons.

The output of the last hidden layer $out_H$ is followed by the output layer. The output layer in the DNN for regression of a single variable is composed of one neuron. The single neuron of the output layer performs the dot product between $out_H$ and the corresponding weights $W^{H,H+1}$ (i.e., the vector of weights dedicated to the links between the outputs of the last hidden layer $X_H$ and the single neuron in the output layer $X_{H+1}$). Then, the output layer neuron also sums its attached bias scalar $b^{H,H+1}$ and implements a linear activation function giving an output as $$g_{i,j}^* = Lin(W^{H,H+1} out_H + b^{H,H+1}) \quad \text{Equation 5}$$

where Lin is the linear activation function $Lin(Z)=Z$ and the output $g_{i,j}^*$ of the DNN is the predicted D2D channel gain between the i-th and the j-th UEs.

As would be understood by one skilled in the art, the above architecture is presented as a non-limiting example, as methods of the present disclosure contemplate any machine learning tool may be used to calculate D2D channel gains based on measured base station channel gains.

Model Training and Exploitation

A further aspect of the disclosed invention is directed to methods of training a neural network. In one embodiment, an offline supervised learning-based solution is used to predict the D2D channel gain between any two UEs from their base station channel gains. One significant benefit of offline training is that actual measurements are not needed for the training phase. Instead, the offline training can be performed using simulations before being deployed in the real world. Although actual measurements are not needed for the training phase, in some embodiments actual measurements may be used, alternatively or in addition to the simulation data. In one embodiment, offline training starts with a simulation of the targeted area (e.g., a cell). Within the area, the positions of the UEs, e.g., i and j, are uniformly generated. The base station channels between the i-th UE and L BSes as well as between the j-th UE and L BSes ($G_{i,j}^C$) are calculated together with the D2D channels between the i-th and j-th UEs $g_{i,j}$ based on the statistical models of the channel gains. The calculated base station channel gains (presenting features) and the D2D gain (presenting the target) together form a single learning sample. The process may then be repeated by generating new positions of the UEs and calculating the channels to constitute new samples. After the samples are collected, the training process is done offline following the typical way used to train any supervised learning-based neural network. In detail, the learning samples are split into a training set and a test set. The samples from the training set are used to train the DNN while the samples in the test set are used to test the accuracy of the trained DNN on a set of samples that is not used for training to prevent overfitting. During the training process, a loss function is defined to evaluate the model prediction accuracy. The loss function in the DNN that builds the model predicting a single variable is typically a measurement showing how great the difference is between the predicted value of the variable and the true value of the variable ($g_{i,j}^*$ and $g_{i,j}$ in the present case). Therefore, taking Equation 3 into account, a mean square error loss function can be written as:

$$\iota = \frac{1}{S} \sum_{s=1}^{s=S} (g_{i,j}^s - g_{i,j}^{s*})^2 \quad \text{Equation 6}$$

where S is the number of the training samples, $g_{i,j}^s$ is the target (true D2D channel gain) the s-th training sample, and $g_{i,j}^{s*}$ is the predicted D2D channel gain based on the base station channel gains of the s-th training sample.

To minimize the mean square error loss function, the weights and biases of the proposed DNN may be updated using backpropagation with any neural network optimization algorithm, including but not limited to a stochastic gradient descent, Adam, or the Levenberg-Marquardt Backpropagation algorithm, which is an optimization method designed to solve non-linear least squares problems. In one embodiment, the Levenberg-Marquardt algorithm can be applied with backpropagation for the neural networks training when the loss function is a sum of squares.

The learning steps are done offline based on the samples collected from the simulations of the area with randomly deployed UEs, but without any connection to specific UEs. The training is focused on obtaining a "mapping" from the measured base station channel gains observed by any two UEs to a channel gain between these two UEs. Thus, the DNN can learn the general relation between the base station channels and the D2D channels in the targeted area and the constructed model is not constrained to any specific UEs or arrangement of UEs.

After the offline learning is complete, the trained DNN in some embodiments is uploaded to the computing device or devices where radio resource management takes place and may then be used to predict the D2D channel gains between any pair of UEs in the in the data collection area. Thus, for multiple UEs, the trained (and tested) DNN may predict all needed channel gains among every pair of UEs independently and in parallel. In some embodiments, based on the base station channel gains measured by the UEs, the trained DNN is used to obtain all D2D channel gains, such as the channel gains between every two DUEs of the same D2D pair, interference channel gains between every pair of DUEs from different D2D pairs and interference channels between the CUES and the DUEs. These can then be exploited to solve any RRM problem using the disclosed algorithms.

Signaling Overhead

In existing networks, the base station channel gains between individual UEs and nearby BSes are commonly estimated (i.e., for conventional communication and handover purposes). The number of the commonly estimated base station channel gains is L(2N+M). In some embodiments, DUEs may change from D2D communication to conventional device-to-base station communication in the case of a sudden D2D communication quality drop and, therefore, the base station channels of DUEs are also periodically estimated and reported.

Conventional RRM algorithms related to the D2D communication (e.g. power control algorithms), require estimation of an additional 2N (2N−1) direct and interference D2D channels between the 2N DUEs. Moreover, for the D2D in shared mode, interference channels between the CUEs and the DUEs are estimated and reported as well. The number of those interference channels between the MCUEs and the 2N DUES that should be estimated is 2NM. Thus, the number of estimated channel gains in the common network with the D2D communication is:

$$\Sigma = L(2N+M) + 2N(2N-1) + 2NM \qquad \text{Equation 7}$$

In the present disclosure, the D2D channel gains are predicted from the common estimated base station channel gains. In other words, in the network with D2D communication utilizing the proposed prediction scheme, the number of channel gains need to be estimated (measured) is limited to the estimation of L(2N+M) channel gains, which are used to predict the remaining needed D2D channel gains. Thus, by subtracting L(2N+M) from Equation 7, the reduction in the number of estimated channel gains may be calculated. This reduction, in the shared mode, is equal to:

$$\Delta\Sigma = \Sigma - L(2N+M) = 2N(2N-1) + 2NM \qquad \text{Equation 8}$$

In a dedicated mode, the CUEs do not affect the D2D communication as the channels allocated to the CUEs are orthogonal to those allocated to the D2D pairs. In such case, the reduction in the number of estimated channel gains achieved by the proposed prediction scheme is determined by setting M to zero in Equations 7 and 8, respectively.

Implementation and System Design

In various aspects, the present disclosure includes a prediction system implementing the methods disclosed herein, and communicatively connected to a communication network comprising a plurality of BSes and UEs. The prediction system in some embodiments includes one or more computing devices communicatively connected to one or more UEs and BSes. In some embodiments, a system includes a first computing device on which the prediction system is trained, and in offline training embodiments, the first computing system may not be connected to any UEs or BSes.

One parameter of the first computing system used to train the model is the number of samples to be collected for the training. The disclosed DNN is in some embodiments trained offline. In some embodiments, the needed samples can be collected by the simulation of targeted area before using the trained DNN in the real world as explained above.

In one embodiment, the machine learning tool, which in some embodiments may be a DNN, can be trained with real data (i.e., real measurements of base station channel gains from two or more communication devices and one or more corresponding D2D gains between one or more D2D pairs within the set of communication devices), if such data is available. In one embodiment, a machine learning tool may be trained using simulated data, as discussed elsewhere herein. In one embodiment, a machine learning tool may be trained using a combination of simulated data and real data. In one embodiment, a machine learning tool may be trained with some combination of real data related to base station channel gains, simulated data related to base station channel gains, and/or location data of one or more communication devices. Data related to the location of one or more communication devices may be measured and provided by the communication device itself, but may also be measured and provided by other devices.

Another parameter of a system of the invention is the computational complexity of the deployed DNN. In general, the computational complexity of the DNN depends on the number of multiplications done by every neuron in each layer between the inputs of the layer and the corresponding weights. In detail, considering that: 1) the disclosed DNN contains H hidden layers with $X_H$ neurons in each layer, 2) the number of DNN inputs is 2L (base station channel gains between two UEs and L BSes), and 3) the number of DNN outputs is one (the D2D gain between two UEs), then, the number of the multiplications performed for the D2D channel prediction is $$\rho = 2LX_1 + \sum_{h=1}^{h=H-1} X_h X_{h+1} + X_H \qquad \text{Equation 9}$$

This computational complexity affects the latency with which the channels are predicted in the network. In one exemplary embodiment, a DNN includes five hidden layers with 20, 18, 15, 12 and 8 neurons, so the number of the performed multiplications ρ=1034 multiplications in when L=3 BSes, consumes a negligible computing time. Although the exemplary embodiment includes five hidden layers, it is understood that a suitable DNN could have any number of hidden layers, including but not limited to a range of between 2 and 20 hidden layers, between 2 and 10 hidden layers, between 3 and 8 hidden layers, or between 4 and 6 hidden layers.

In the above example, the latency introduced by the DNN is negligible and the overall delay is (at most) the same as the latency of any other existing centralized approach, within which the D2D channel gains need to be estimated via reference signals, and then reported to the same unit where the DNN is running. In a more realistic scenario with a higher number of users, the high signaling in a conventional centralized approaches requires a high number of reference signals transmitted/received. The high number of the reference signals consumes significant resources and can lead to additional delays due to channel measurement scheduling. With the disclosed system, such delays are avoided and the overall delay is reduced to simple multiplications executed by the DNN.

In some embodiments, the disclosed system includes RRM algorithms configured to execute in dynamic environments or scenarios (e.g., moving users, users becoming active/inactive, etc). In some embodiments, an RRM algorithm (e.g., channel allocation, power control, etc.) may be performed periodically. In such embodiments, the channel/gain selection calculation is expected to be repeated periodically as well to update the predicted D2D channel gains. The predicted D2D channels at each time instant may be inserted as inputs to one or more RRM algorithms and every DUE is directed to change its communication parameters (e.g., the channels the DUE is occupying, the DUE's transmission power at every channel, etc).

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the system and method of the present invention. The following working examples therefore, specifically point out the exemplary embodiments of the present invention, and are not to be construed as limiting in any way the remainder of the disclosure.

In this section, simulation scenarios and parameters are described, and simulation results are discussed from three different perspectives as follows. First, the accuracy of the prediction scheme is analyzed statistically showing how close the predicted D2D channel gains were to the true gains of the D2D channels. Second, the performance of the proposed prediction scheme is illustrated on selected examples of existing algorithms for D2D RRM in the mobile network, and the effect of the prediction scheme on D2D communication quality and network's signaling overhead is demonstrated. The disclosed system aims to reduce the signaling overhead needed for D2D communication without significant losses in communication quality. Finally, the robustness of the proposed scheme is evaluated against environmental changes and potential inaccuracies in the simulations during the training phase.

System Model

The disclosed model can be demonstrated by an exemplary embodiment including L base stations (BSes) deployed randomly in a square area together with UUEs as shown in FIG. 1. In the example of FIG. 1, the system model includes four DUEs, one CUE and three BSes. For clarity, only part of the signalling (channel estimation) is shown. The UEs are divided into M CUEs and 2N pieces of D2D user equipment (DUEs) composing ND2D pairs, hence, U=2N+M. Each D2D pair consists of a transmitter, $DUE_T$, and a receiver, $DUE_R$.

For the purposes of the example, the capacity of the n-th D2D pair at the k-th communication channel is defined as:

$$C_n^k = B_k \log_2\left(1 + \frac{p_n^k g_{n,n}}{B_k \sigma_0 \sum_{\substack{1 \le q \le N \\ q \ne n}} p_q^k g_{q,n} + \sum_{m=1}^{m=M} p_m^k g_{m,n}}\right) \quad \text{Equation 10}$$

where, for the k-th channel, $B_k$ is the channel bandwidth, $p_n^k$ is the transmission power of the $DUE_T$ of the n-th D2D pair, $p_m^k$ is the transmission power of the m-th CUE, and $p_q^k$ is the transmission power of the $DUE_T$ of the q-th D2D pair causing interference to the n-th D2D pair (i.e., q∈{1, . . . , N}/{n}). Further, $g_{n,n}$ represents the channel gain between the $DUE_T$ and the $DUE_R$ of the n-th D2D pair, $\sigma_o$ is the noise density (without loss of generality, assuming Additive White Gaussian Noise), $g_{m,n}$ is the interference channel gain between the m-th CUE and the $DUE_R$ of the n-th D2D pair, and $g_{q,n}$ is the interference channel gain between the $DUE_T$ of the q-th D2D pair and the $DUE_R$ of the n-th D2D pair. In this disclosure, the term "channel gain" refers to the magnitude of the channel gain, as the magnitude is commonly exploited for, e.g., channel allocation, power control, or to determine the system capacity. Although the present example uses the capacity model in Equation 10 to evaluate the performance of the disclosed model, it is understood that in real-world scenarios, the network capacity may be measured directly on the network.

The disclosed system model assumes a complete absence of channel gain knowledge among the UEs. Thus, the channel between $DUE_T$ and $DUE_R$ of the same D2D pair, interference channels among DUEs of different D2D pairs, and interference channels among the CUEs and the DUEs (i.e., $g_{n,n}$, $g_{q,n}$, and $g_{m,n}$ in Equation 10) are unknown.

The DUEs and the CUEs in some embodiments estimate uplink/downlink channels to efficiently manage resource allocation and for handover purposes. Thus, although the D2D channel gains are not known by the network, in some embodiments, the model includes the step of measuring and periodically sharing information on the channel quality between each UE (CUE or DUE) and its neighboring BSes to the serving BS in order to update the network information. In various embodiments, the channel quality information is shared at a rate of between once per minute and 10 kHz, or between once per minute and 5 kHz, or between once per minute and 1 kHz, or between ten times per minute and 1 kHz, or between 30 times per minute and 500 Hz, or between 1 Hz and 1 kHz, or between 1 Hz and 100 Hz, or between 5 Hz and 50 Hz, or any range in between. The corresponding estimated channel gain between any i-th (or j-th) UE and the l-th BS is denoted as $G_{i,l}$ (or $G_{j,l}$). These base station channel gains ($G_{i,l}$ and $G_{j,l}$) are assumed to be represented by uplink channel gains estimated (measured) by the BS using methods known in the art, from the existing reference signals, for example as described in 3GPP TS 36.211, "Evolved Universal Terrestrial Radio Access (E-UTRA); Physical channels and modulation," v13.5.0, Release 13, 2017, incorporated herein by reference.

In some embodiments, downlink channel gains can also be used to estimate the quality of base station channels as downlink gains can be estimated (measured) by the UEs and fed back to the BS.

Simulation Scenarios and Performance Metrics

A scenario with up to 20 DUEs was considered, composing up to 10 D2D pairs, and 10 CUEs deployed uniformly within an area of 250×250 m² covered by up to 5 BSes. Although the DUEs were uniformly distributed, the maximum distance between the $DUE_T$ and the $DUE_R$ of the same D2D pair was upper-bounded by a maximal distance of $d_{max}=50$ m to guarantee the availability of D2D communication. For any D2D transmitter, the maximal and the minimal transmission powers were set to $p_{max}=24$ dBm and $p_{min}=1$ dBm, respectively.

Figure 4A:
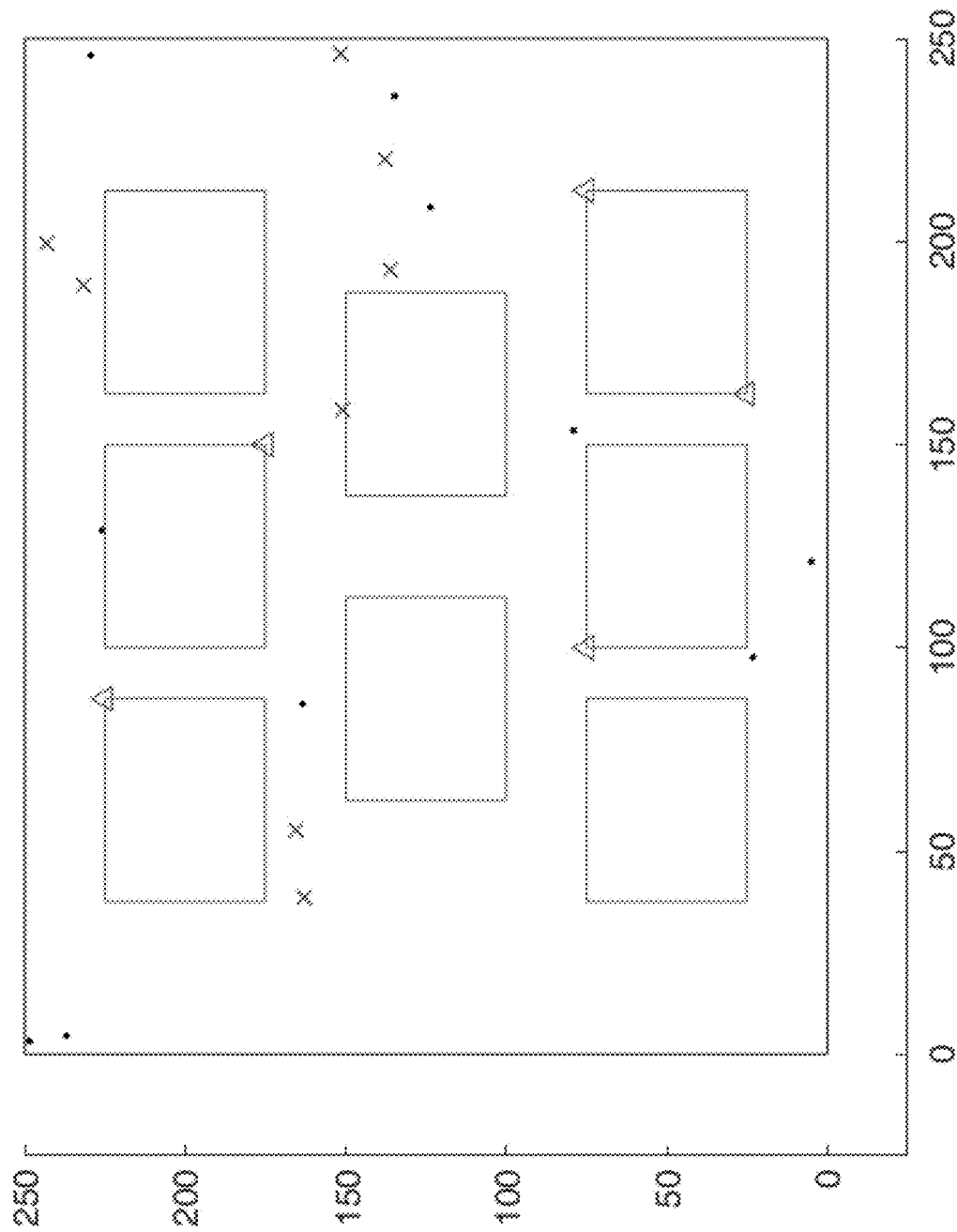
FIG. 4A is an exemplary diagram of a simulated urban environment.
Figure 4B:
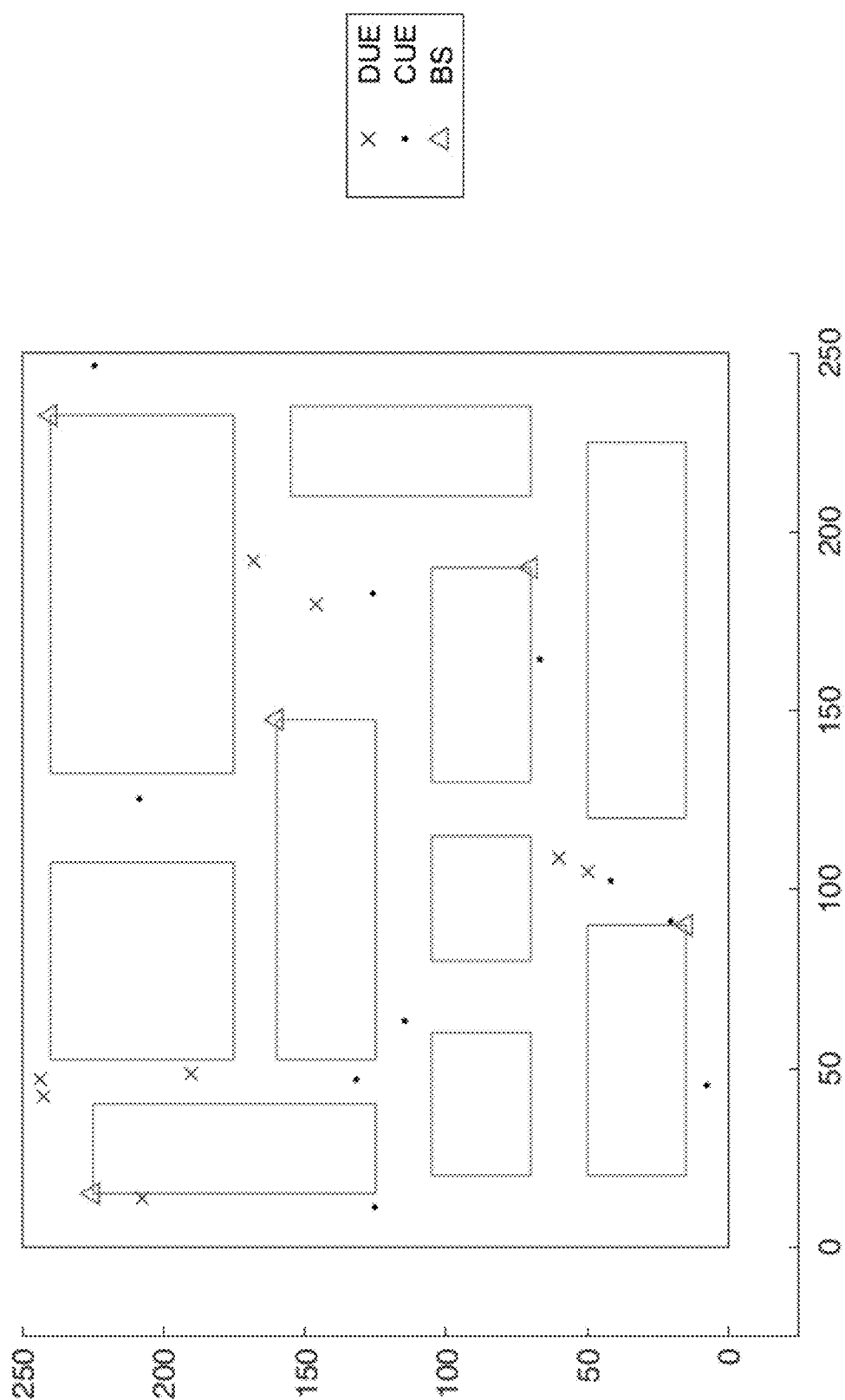
FIG. 4B is an exemplary diagram of a simulated urban environment.

Three different scenarios were considered according to the signal propagation between the UEs and the BSes and among all UEs. The first scenario assumes an open rural area denoted as Rural with a full availability of line-of-sight (LOS) for all channels (D2D channels and base station channels). The other two scenarios, illustrated in FIG. 4A and FIG. 4B, correspond to two different urban areas with fixed obstacles (FOs) representing e.g., buildings, referred to herein as Urban1 (FIG. 4A) and Urban2 (FIG. 4B). Urban1 and Urban2 are configured with N=4, M=10, and L=5, as well as several FOs represented by rectangles. The area of Rural is identical to Urban1 and Urban2, but without any FOs. In Urban1 and Urban2, the buildings lead to a certain probability of non-line-of-sight (NLOS) for both the D2D and base station channels. The two different urban areas are simulated to validate the disclosed prediction approach for different obstacle topologies without any changes in the DNN architecture.

In all areas, Rural, Urban1 and Urban2, a LOS path loss is generated in line with 3GPP recommendations. In Urban1 and Urban2 it is assumed that the communication channel intercepted by one or more building walls is exposed to an additional loss of 10 dB per wall. While FIG. 4A and FIG. 4B present a 2D projection of simulated urban areas, the simulated building heights are distributed uniformly between 20 and 30 m to randomly affect NLOS and LOS probabilities. Simulation parameters are summarized in Table 1 below.

TABLE 1

| Parameter | | Value |
| --- | --- | --- |
| Carrier frequency | fc | 2 GHz |
| Bandwidth | B | 20 MHz |
| Number of D2D pairs | N | 2-10 |
| Number of CUEs (shared mode only) | M | 10 |
| Number of channels (shared mode only) | K | 10 |
| Bandwidth per any k-th channel (shared mode only) | $B_k$ | 2 MHz |
| Maximal distance between $DUE_T$ and $DUE_R$ of the same pair | $d_{max}$ | 50 m |
| Number of BSes | L | 1-5 |
| Maximal transmission power | $p_{max}$ | 24 dBm |
| Minimal transmission power | $p_{min}$ | 1 dBm |
| Noise power spectral density | $\sigma_o$ | −174 dBm/Hz |

1,000,000 samples were collected from the simulation for the learning process. The samples were then divided into a first subset used for DNN training (70% of samples) and a second subset used for testing (30% of samples). A "sample" here refers to the BS gains from a randomly-placed UE pair and the optimal D2D channel selection based on the environment.

The exemplary DNN used in this example had five hidden layers composed of 20, 18, 15, 12, and 8 neurons, respectively. The number of the DNN inputs was between 2 and 10 (i.e., the base station channels between two UEs and between 1 and 5 BSes); and for three areas (Rural, Urban1, and Urban2), but in some embodiments, the exemplary configuration of hidden layers and neurons is suitable for use with any number of UEs, BSes, and inputs.

In this experiment, the prediction scheme was evaluated from following perspectives:

i. Statistical evaluation of the prediction accuracy before implementing the prediction scheme in the mobile network. For the statistical evaluation, the Pearson correlation coefficient was used as a performance metric to show the accuracy of the predicted D2D channel gains with respect to the true channel gains. The Pearson correlation coefficient values range between zero and one where the value of one represents a complete match between the predicted and the true values of the D2D channel gains.

ii. Simulated performance of D2D communication with the proposed prediction. Performance is represented by the sum capacity of the D2D pairs $C=\Sigma_{n=1}^{n=N}\Sigma_{k=1}^{k=K}C_n^k$ and by the signaling overhead corresponding to the number of channel gains to be estimated/reported in the network.

iii. Robustness of the proposed scheme to identify the impact of potential inaccuracies between the simulations of the targeted area for training and a real-world area, and the resistance to the changes in the real-world environment.

The three above-mentioned evaluation perspectives are presented in the next subsections.

Statistical Analysis of the Prediction Schemes

In this subsection, the results related to $g_{i,j}$ prediction are statistically analyzed. In other words, as the training is done offline before its usage in the mobile network, the prediction accuracy was studied from a statistical point of view showing how close the predicted gain of a D2D channel was the true gain of the selected channel. The statistical results of predicting a single D2D channel gain were shown by testing the trained DNN on the test set.

Figure 5:
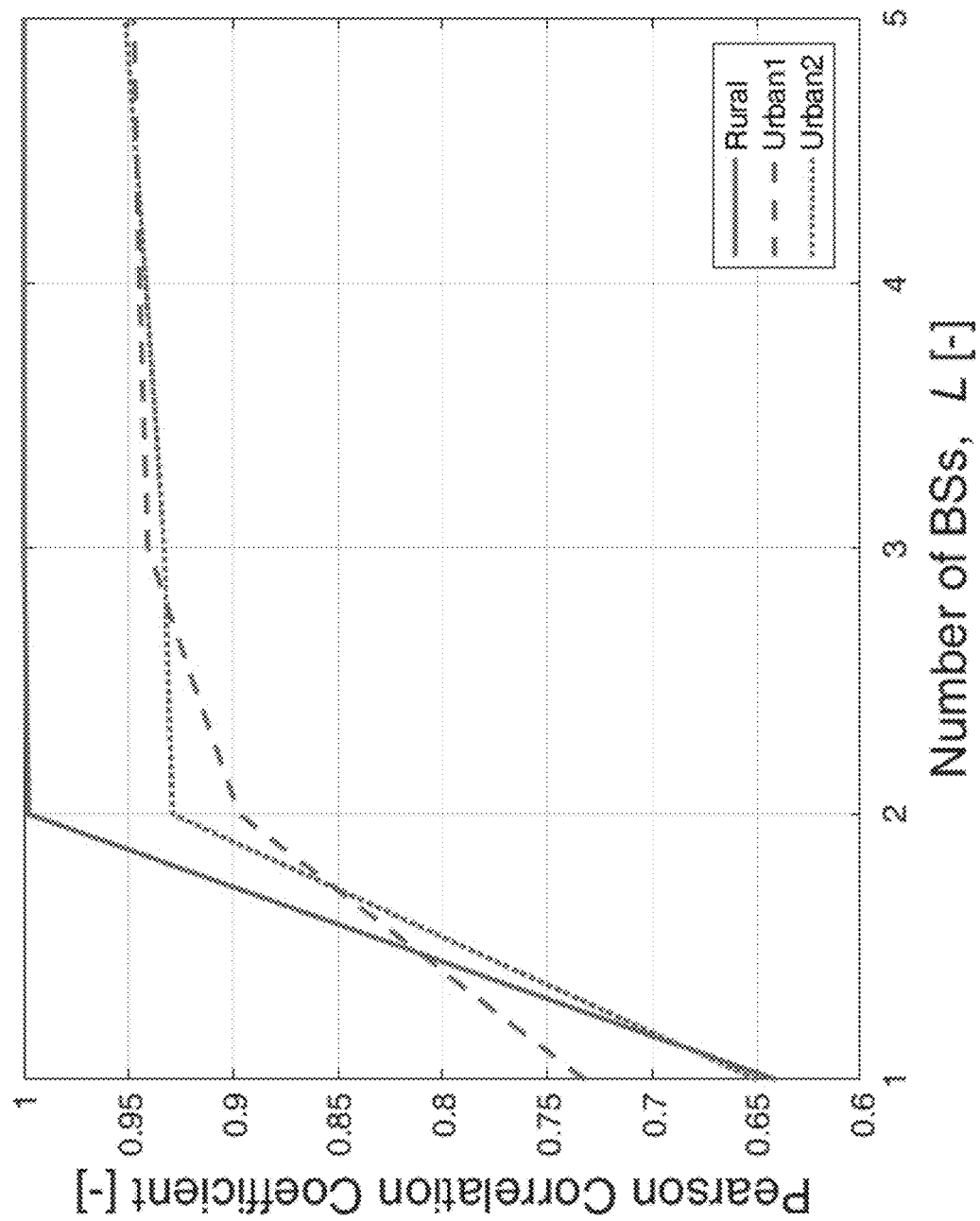
FIG. 5 is a graph of Pearson correlation coefficient over number of base stations.

FIG. 5 is a graph of the Pearson correlation coefficient between true and predicted D2D channel gains over different numbers of BSes. As expected, the Pearson correlation coefficient increased with the number of BSes in all areas. For example, in the Rural area with a single BS, the Pearson correlation coefficient was 0.64, which was not enough to extract a well-performing relation between the cellular and the D2D gains. With two or more BSes, the Pearson correlation coefficient in the Rural area reaches almost a perfect value (i.e., 0.999). In the urban areas, the Pearson correlation coefficient values were generally similar and, and the values converged further as the number of BSes increased. For only one BS, the correlation coefficients for both urban areas vary by about 0.09 due to the effect of the BS locations and the fixed obstacle (i.e., buildings) locations. When the number of BSes was increased to 2, the difference fell below 0.03, and for three BSes, the Pearson correlation coefficients were almost the same for both areas with a difference of less than 0.01. As shown in FIG. 5, for three or more BSes, the correlation coefficient nearly saturates for both urban areas, almost reaching their maximal values. The maximum Pearson correlation coefficient achieved in urban areas (i.e., around 0.95) was lower than the Rural area (i.e., 0.999) because the base station channel gains are less random in the Rural area where buildings were absent and only LOS channels were present.

Figure 6A:
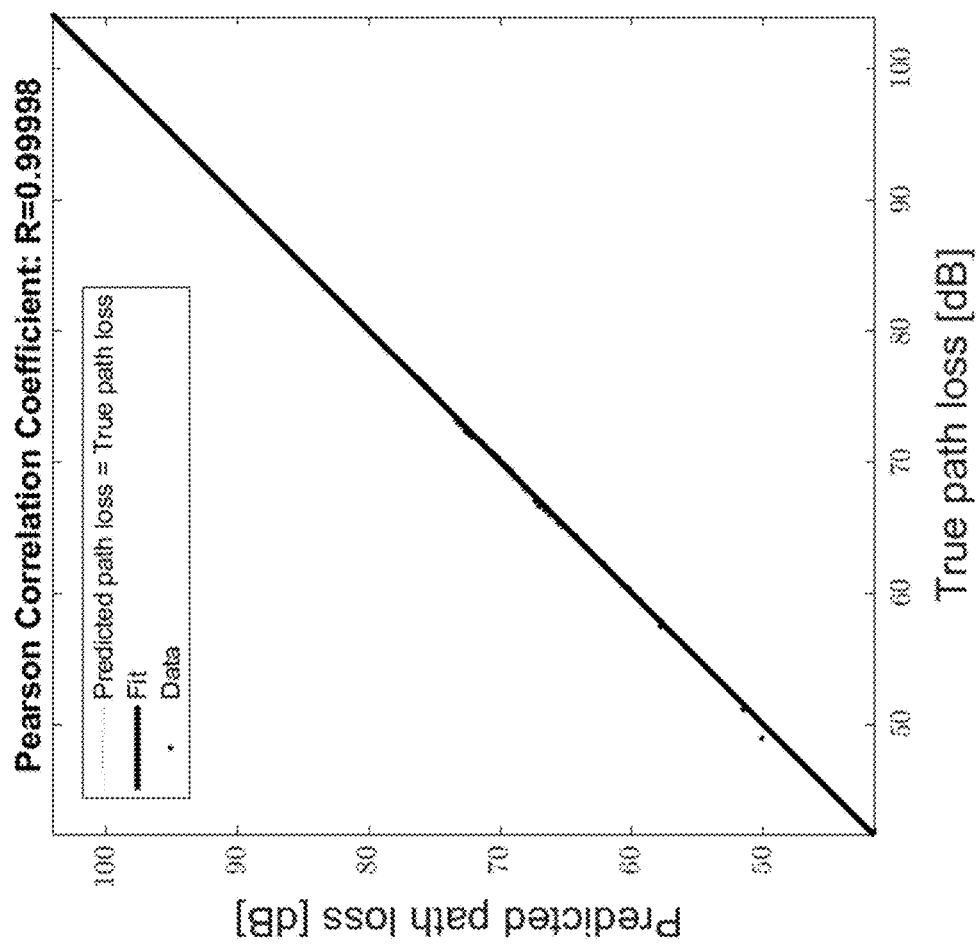
FIG. 6A is a graph of predicted path loss vs. true path loss for an exemplary simulated rural environment.
Figure 6C:
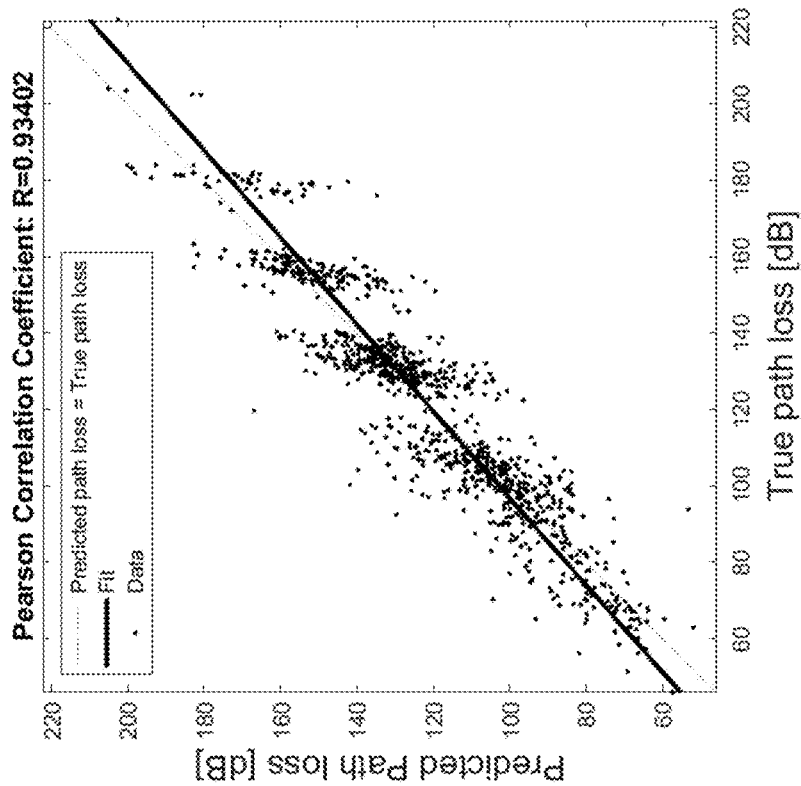
FIG. 6B and FIG. 6C are graphs of predicted path loss vs. true path loss for exemplary simulated urban environments.
Figure 6B:
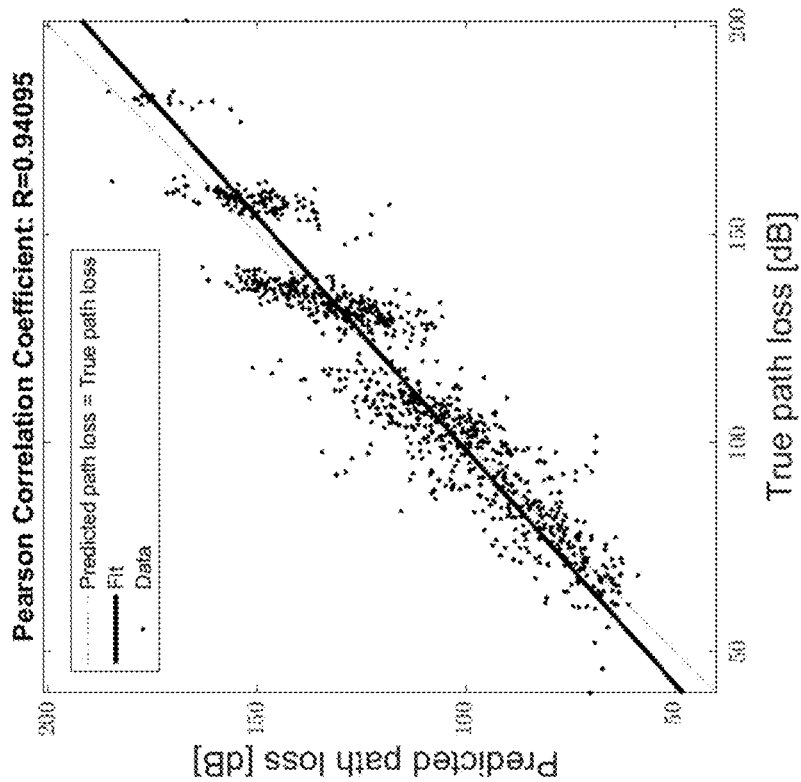

FIG. 6A, FIG. 6B, and FIG. 6C show regression plots for Rural (FIG. 6A), Urban1 (FIG. 6B), and Urban2 (FIG. 6C) with L=3 BSes and considering 1,000 testing samples from the test set. In general, the values of the path loss in the urban areas were spread in a wider domain compared to the Rural area. This is because of the presence of the FOs and, thus, also NLOS links as explained above. The path loss values in Urban2 were spread a slightly more (up to 220 dB) comparing to the Urban1 area (up to 200 dB) as Urban2 contains more FOs than Urban1. It is also shown in FIG. 6A that the in the Rural area, the predicted path loss (i.e., $10 \log_{10} 1/g_{i,j}^*$) matched the true path loss (i.e. $10 \log_{10} 1/g_{i,j}$) almost perfectly.

Some deviation of the predicted path losses from the true values is seen in FIG. 6B and FIG. 6C in both urban areas. This deviation was a result of the FOs causing uncertainty in the values of the estimated channel gains. Nevertheless, the predicted and the true path losses were still highly correlated and Pearson correlation coefficient equals 0.94 and 0.934 for the Urban1 and Urban2 areas, respectively.

Figure 7:
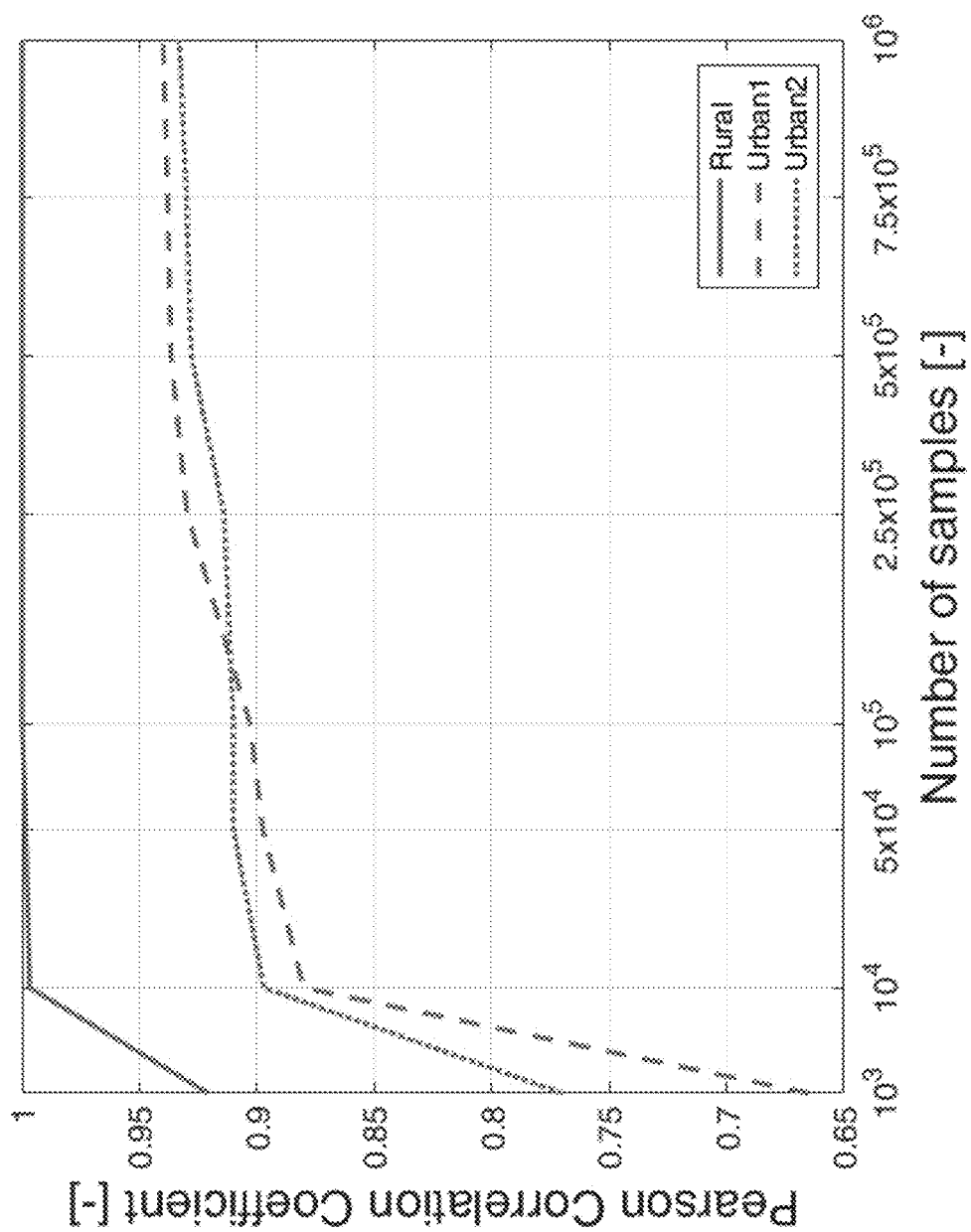
FIG. 7 is a graph of Pearson correlation coefficient over number of samples.

The results presented in FIG. 5 and FIG. 6A-FIG. 6C are based on learning with 1,000,000 samples. FIG. 7 illustrates the influence of the number of samples on the learning accuracy, with the Pearson correlation coefficient over number of samples for the Rural and both of the urban areas. In all areas, the correlation coefficient increased rapidly in the lower number of the samples. In all scenarios, the number of samples eventually reached a saturation point where increasing the number of samples further only returned a negligible increase in the Pearson correlation coefficient. In the Rural area, the saturation point was about 10,000 samples. For both urban areas, more samples were needed to reach saturation due to the higher difficulty of constructing a model that connects the base station channel gains to the D2D channel gains in the presence of FOs. FIG. 7 shows that the values of the Pearson correlation coefficient in the Urban2 area were higher compared to the Urban1 area at low number of samples. This is because the outdoor space was smaller in Urban2 and therefore fewer learning samples (compared to the Urban1) provided a clearer idea about the general relation between the cellular and the D2D gains. Thus, the Pearson correlation coefficient was closer to the saturation value in the Urban2 area with respect to the Urban1 area for a low number of samples. However, with the increasing number of samples, the DNN used for the Urban1 started to learn the topology of the area and the Pearson correlation coefficient increased and saturated to a final value that was slightly higher than the one reached in the Urban2 area. The reason is that the higher number of FOs in Urban2 makes it harder for the DNN to memorize the corresponding network topology and to extract the relation between the cellular and the D2D gains. For both urban areas, even 10,000 samples was sufficient to reach correlation coefficients of above 0.88.

Figure 8:
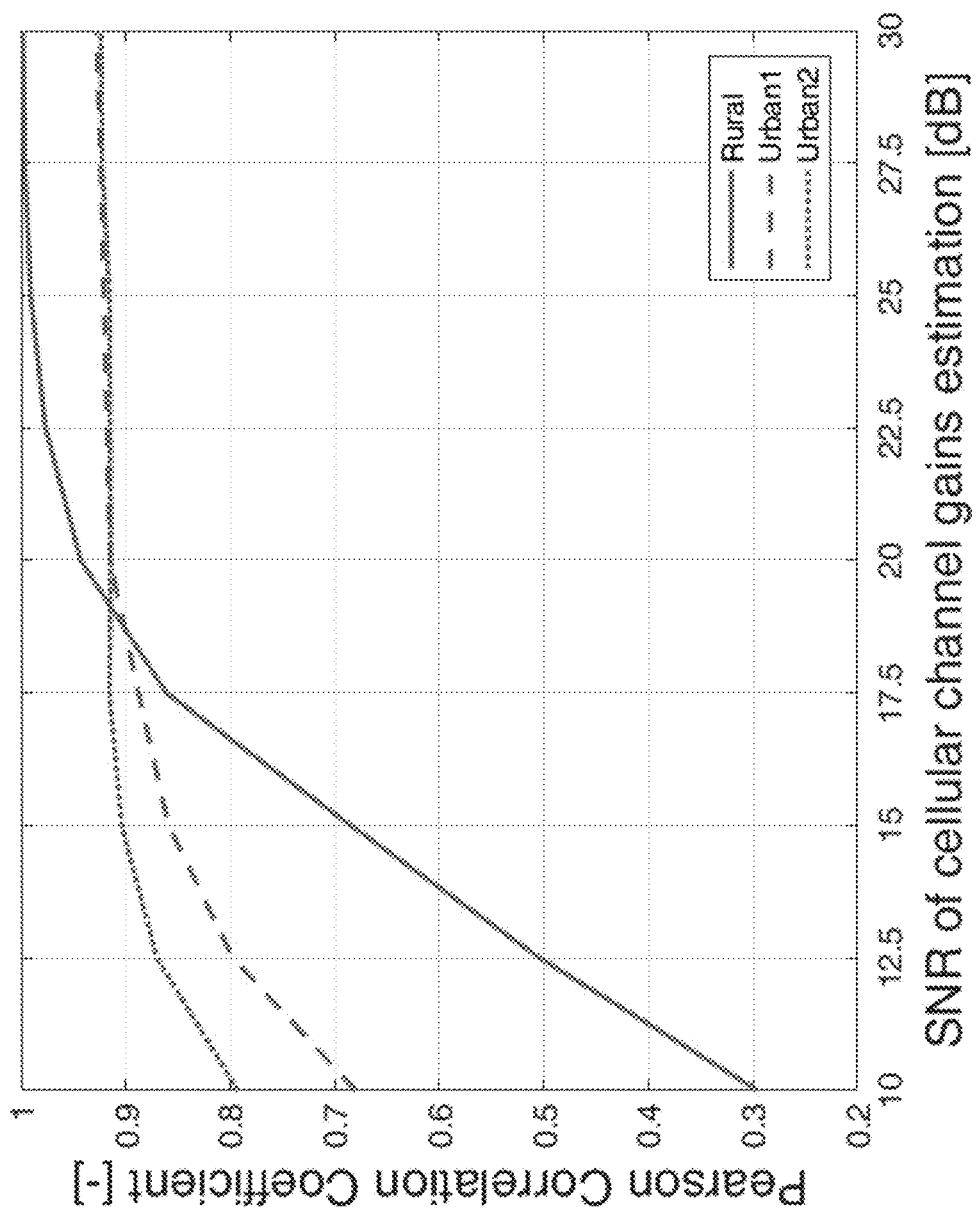
FIG. 8 is a graph of Pearson correlation coefficient over signal-to-noise ratio.

With reference now to FIG. 8, the effect of noise on the accuracy of estimation of the conventional base station channels by the BSes is shown. $SNR_G$ is defined as zero-mean Gaussian noise (i.e., the error) added to the modeled base station channel gain estimation. Hence, $SNR_G$ represents the base station channel gain estimation accuracy and it is expressed as the ratio between the true base station channel gain (UE to BS) and the noise representing an error in estimation of the UE to BS channel. Noise of $\square(0, e)$ was added (where $SNR_G = 10 \log_{10} G_{i,j}/e$ dB) to the estimated base station channel gain of $G_{i,j}$. FIG. 8 shows that with the increasing SNR of the base station channel gain estimation, the correlation coefficient between the true and predicted D2D channel gains increased gradually until saturation was reached when $SNR_G$ reached 25 dB, 20 dB, and 17.5 dB for the Rural, Urban1, and Urban2 areas respectively. This is interesting because a higher probability of LOS led to a higher sensitivity of the prediction scheme to the channel estimation noise. Consequently, the trained model for the D2D channel prediction in the Rural area is more sensitive to the channel estimation noise than the trained model for the Urban1 area. Similarly, the trained model for the D2D channel prediction in the Urban1 area is more sensitive to the channel estimation noise than the trained model for the Urban2 area. The reason is that, in the Urban2 area, more space is occupied by the FOs (i.e., buildings) compared to the Urban1 area, while the Rural area contains no FOs (i.e., the LOS probability in the Rural area is higher than in the Urban1 area, and the LOS probability of the Urban1 area is higher than in the Urban2 area).

Performance of D2D Communication Aided by the Prediction Scheme

In this subsection, the impact of exploiting the proposed D2D channel prediction scheme based on machine learning is shown for the D2D communication in the mobile network. For this purpose, two up-to-date RRM algorithms were adopted, one for the channel allocation in the D2D shared mode and one greedy algorithm for a binary power control in the D2D dedicated mode. For both algorithms, the performance (i.e., sum capacity of D2D pairs and the number of channels needing to be estimated) was compared in the case when these algorithms were supported by the disclosed D2D channel prediction scheme, against the base case when the algorithms were implemented without the machine learning-based prediction approach. Both algorithms were evaluated in an environment with L=3 BSes and M=10 CUEs. The purpose of this comparison was to show that the performance of the existing RRM schemes reached with the proposed prediction scheme is not impaired while a substantial reduction in signaling overhead is achieved. Note that, in the legend of this subsection's figures, CA and PC are used to denote channel allocation scheme in the shared mode and binary power control in the dedicated mode.

Figure 9A:
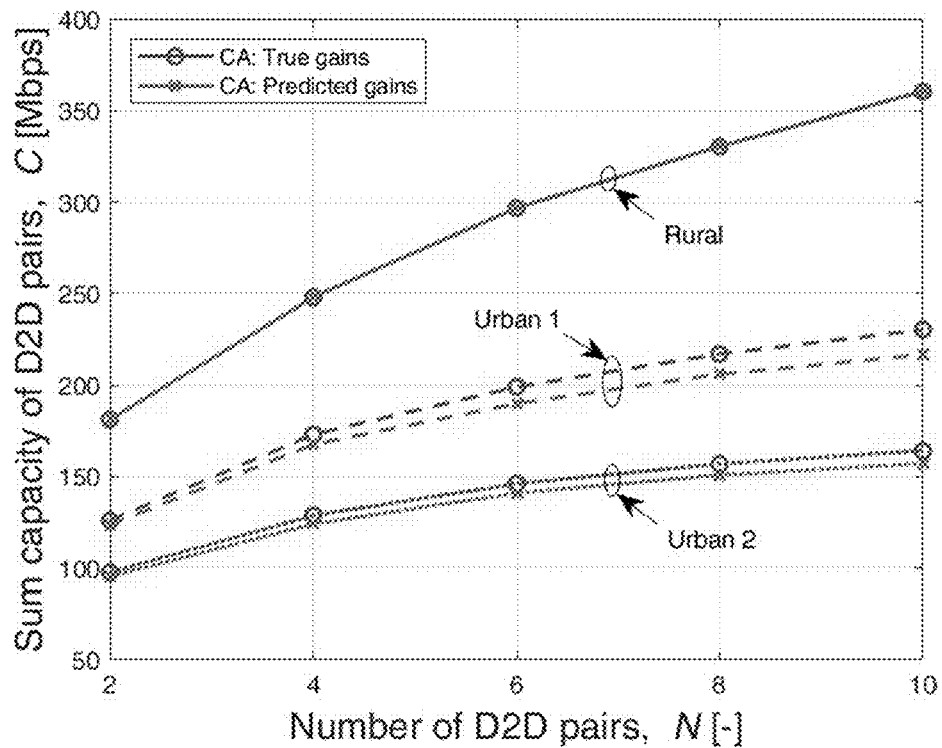
FIG. 9A and FIG. 9B are graphs of sum capacity of D2D pairs over the number of D2D pairs.

FIG. 9A shows the sum capacity of D2D pairs over the number of D2D pairs communicating in the shared mode and with the channel allocation scheme implemented on the true (from P. Mach, et al., "Resource Allocation for D2D Communication with Multiple D2D Pairs Reusing Multiple Channels," *IEEE Wireless Communications Letters*, 8(4), pp. 1008-1011, 2019, incorporated herein by reference) and the predicted D2D channel gains. FIG. 9A illustrates that, by comparing the sum capacity reached when the true D2D gains are known and when the predicted D2D channel gains are used, the capacity loss induced by the prediction scheme reached 0%, 4%, and 6% for the Rural, Urban1, and Urban2, respectively. This behavior was expected as the Rural area contains no FOs and the disclosed prediction scheme reached a higher Pearson correlation coefficient in the Rural area compared to the Urban1 and Urban2 areas. Moreover, the Urban1 area contained fewer FOs and the disclosed prediction scheme reached a slightly higher Pearson correlation coefficient in the Urban1 than in the Urban2, thus a lower gap in the sum capacity between the true and the predicted gains was achieved in the Urban1 area.

Figure 9B:
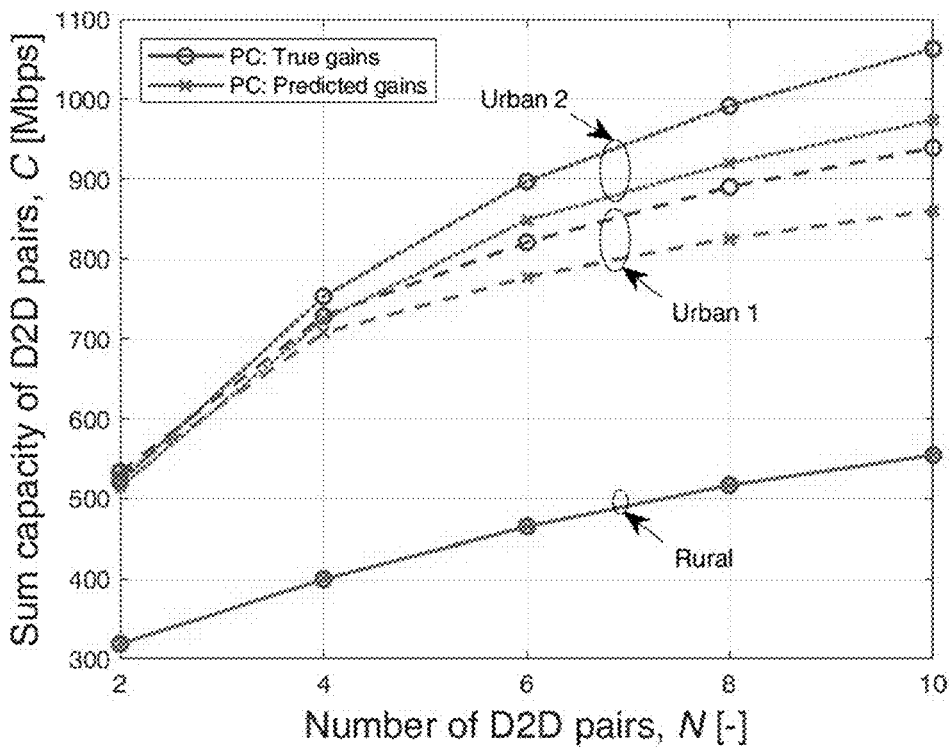

The performance of a greedy algorithm for binary power control in D2D dedicated mode (from A. Gjendemsjo, et al., "Binary Power Control for Sum Rate Maximization Over Multiple Interfering Links," IEEE Trans. on Wireless Commun., 7(8), pp. 3164-3173, 2008, incorporated herein by reference) is shown in FIG. 9B, where the D2D pairs were considered to reuse the whole bandwidth. The greedy algorithm was implemented to make a binary transmission power decision for each D2D pair with true and predicted D2D channel gains. In the Rural area, a perfect matching between the binary power control implemented on true and on predicted gains was achieved due to the very high accuracy in the prediction of the D2D channel gains. In the urban areas, only a small loss in the sum capacity, ranging from 1% (for two pairs) to 9% (for ten pairs) in both the Urban1 and the Urban2 areas, was introduced by implementing the binary power control on the predicted D2D channel gains compared to the binary power control based on the true gains. Such a loss can be expected by the fact that making a binary decision about the transmission power of each D2D pair is critical and highly sensitive to the accuracy of the predicted D2D channel gains. Nevertheless, ten D2D pairs in proximity reusing a single channel is an extreme case that is not expected to occur often in the real network. By contrast, in a more reasonable case, four or six D2D pairs reuse a single channel. For example, with four D2D pairs, the binary power control implemented on the predicted D2D channel gains lost only 2.9% and 3.9% in the Urban1 and Urban2 areas, respectively, compared to the binary power control with full knowledge of the true D2D channel gains. Such small difference between the Urban1 and the Urban2 areas is understandable as the Urban1 area contains fewer FOs, and the disclosed prediction scheme reaches a slightly higher Pearson correlation coefficient in the Urban1 area than in the Urban2 area.

Figure 10:
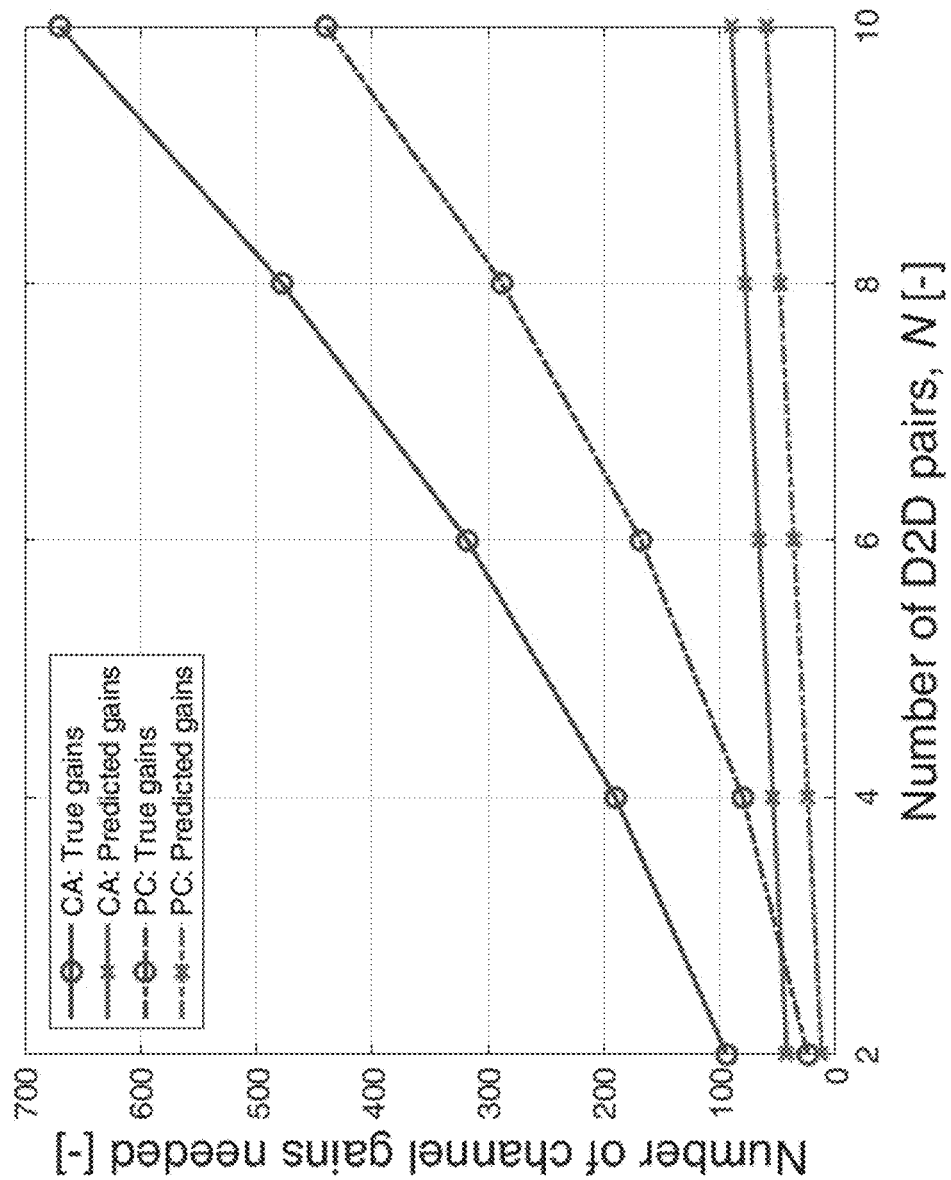
FIG. 10 is a graph of the number of channel gains needed over the number of D2D pairs.

With reference now to FIG. 10, the signaling overhead is shown in terms of the number of channels estimated by the network if the channel allocation scheme from Mach, et al. and the greedy algorithm for binary power control from Gjendemsjo, et al. were implemented on true and predicted D2D channel gains. As shown in FIG. 10, for both the channel allocation scheme and the power control algorithm, the number of estimated channel gains with the proposed prediction scheme was significantly lower than when all the channel gains would need to be estimated. More specifically, the disclosed model needed to estimate/report up to approximately seven times fewer channel gains when used in the channel allocation scheme or the power control algorithm compared to the case when the knowledge of all gains would be required.

Robustness of the Disclosed Scheme

In this subsection, the robustness of the disclosed scheme was analyzed when the offline simulation-based trained DNN was used to predict the D2D channel gains in a real-world environment that differed from the simulated area used for training, for example if the real-world environment changes.

Figure 11A:
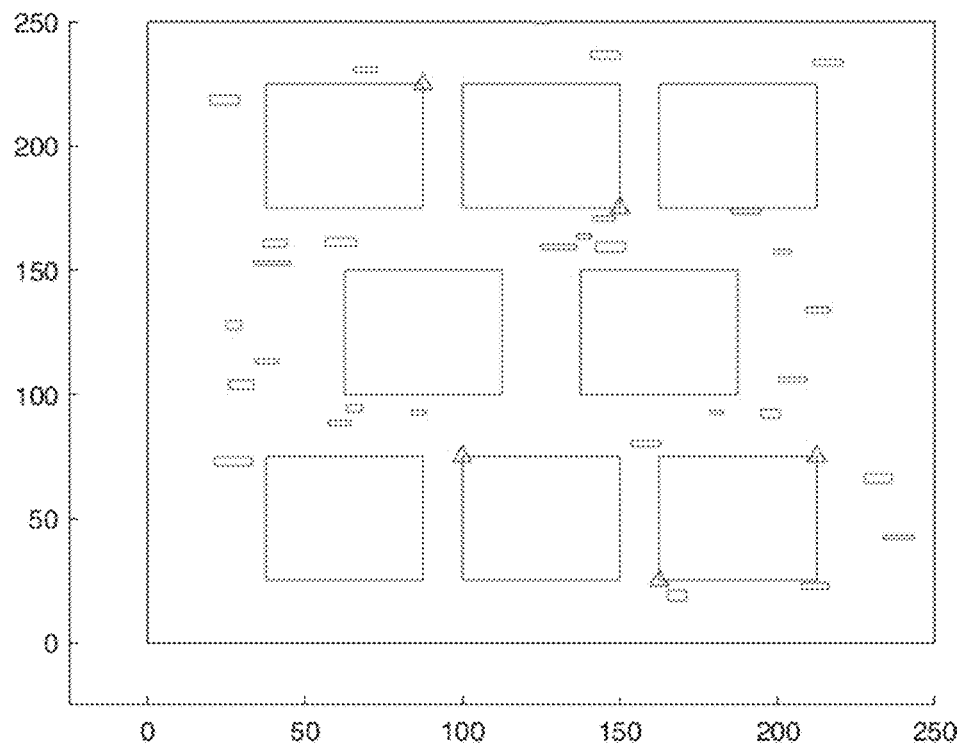
FIG. 11A and FIG. 11B are exemplary diagrams of simulated urban environments.
Figure 11B:
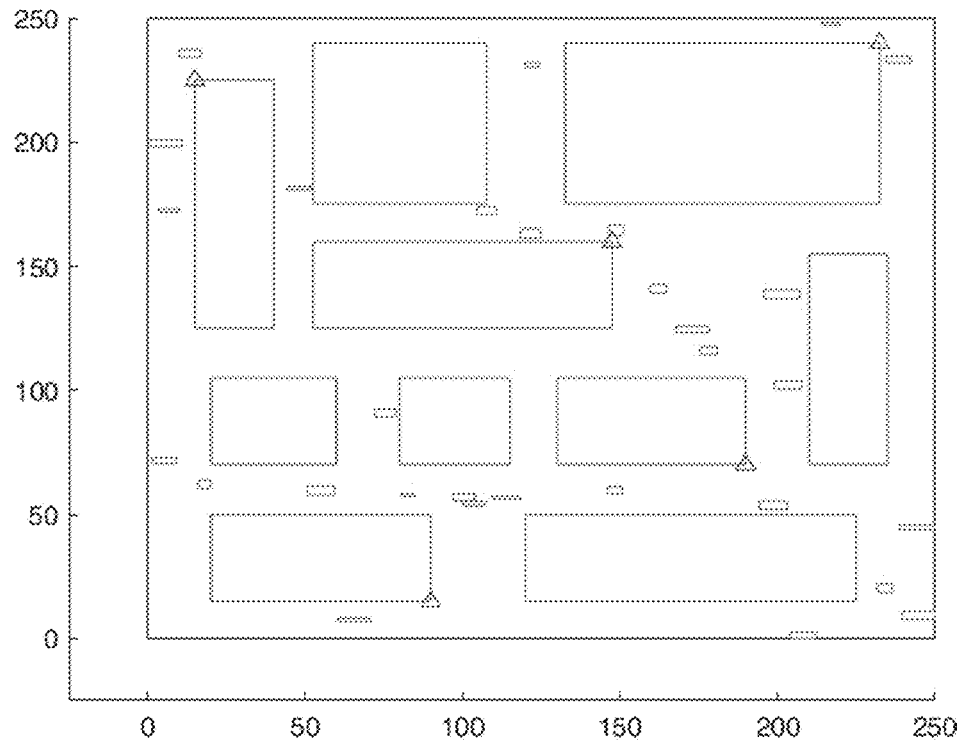

First, the impact of moving obstacles (MOs, for example vehicles) in real-world urban areas was studied on the disclosed prediction scheme as the presence and the movement of these MOs was not captured during offline training by means of simulations. In this respect, up to 30 MOs representing, e.g., vehicles or position-changing obstacles, were uniformly distributed outdoor in new environments Urban3 shown in FIG. 11A (based on original Urban1) and Urban4 shown in FIG. 11B (based on original Urban2). The dimensions of each MO and its attenuation were also uniformly generated such that the length of each MO was between 2 and 6 m, the width varied from 0.5 to 2 m, the height varied from 1.5 to 3 m, and the attenuation varied between 1 and 5 dB. The red triangles in FIG. 11A and FIG. 11B represent BSes. All above-mentioned values were regenerated randomly in every simulation drop.

Figure 12A:
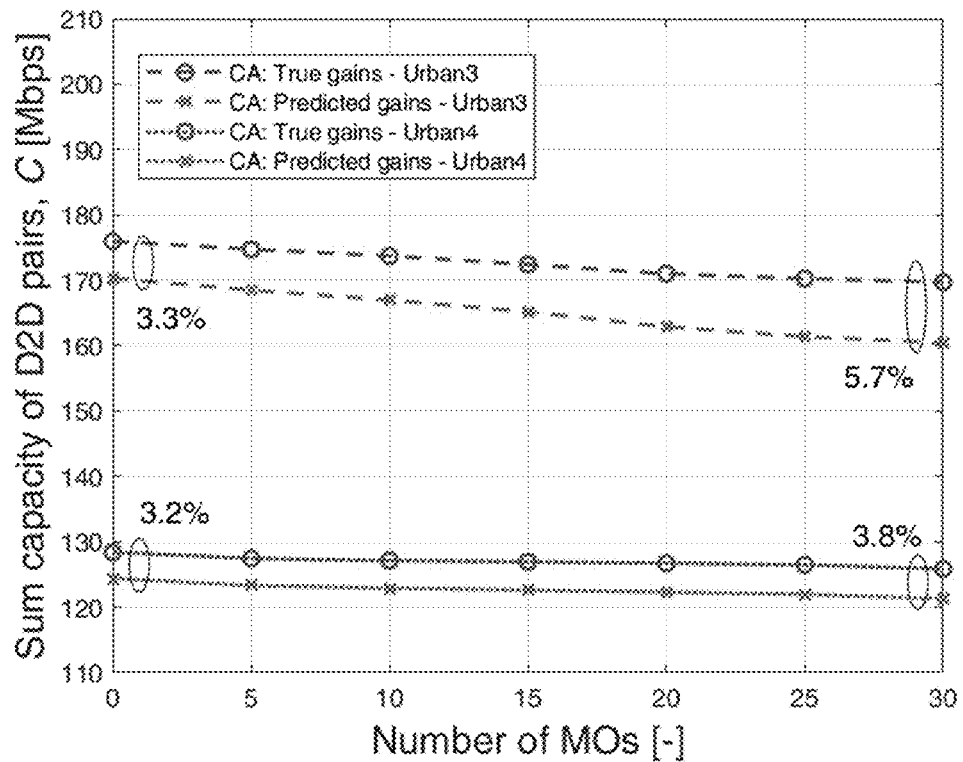
FIG. 12A and FIG. 12B are graphs of sum capacity of D2D pairs over the number of D2D pairs.
Figure 12B:
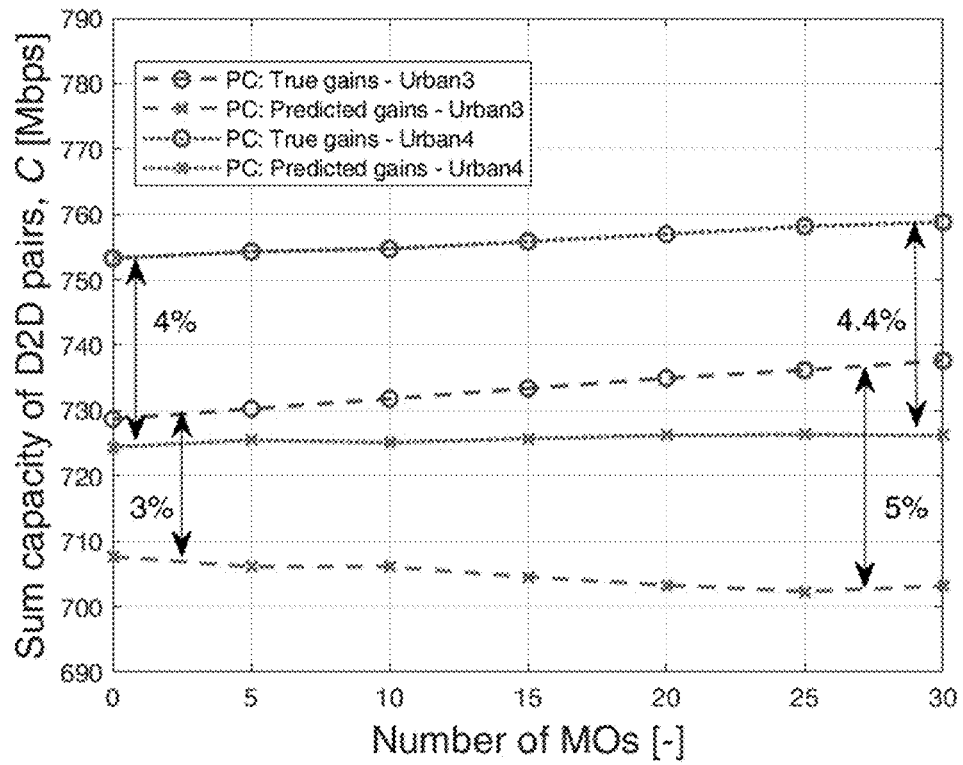

In FIG. 12, the effect of the MOs on the channel allocation algorithm from Mach, et al. and the binary power control algorithm from Gjendemsjo, et al. was analyzed with four D2D pairs. As expected, the difference between the sum capacity when the D2D true channel gains were known and the case when the disclosed prediction scheme was exploited increased with the number of MOs in the area. This was due to the signal attenuation differences induced by the MOs' presence in the environment compared to the training scenario simulated without those MOs. For the channel allocation algorithm and with 30 MOs in the area, the additional capacity losses were 2.4% (5.7%-3.3%), and 0.6% (3.8%-3.2%) for the Urban3 and Urban4 areas, respectively (see FIG. 12A). In the case of power control (FIG. 12B), the additional capacity losses with 30 MOs in the area were 2% (5%-3%) and 0.4% (4.4%-4%) for the Urban3 and Urban4 areas, respectively. Such low losses are acceptable as the disclosed channel prediction scheme allowed D2D communication without requiring specific D2D channel measurements.

FIG. 12A and FIG. 12B also show that the prediction scheme was more sensitive to the MOs' existence in the Urban3 area compared to the Urban4 area. This is in line with FIG. 8, which shows that a higher ratio of LOS communication in the area (i.e., the lower number of obstacles) led to a higher sensitivity to the noise in the channel gains estimation. The attenuation added by the MOs can be considered as noise because its unpredictable. Hence, the MOs presence affects the Urban3 area more than the Urban4 area, as the Urban3 contains a larger area where LOS communication is possible due to the smaller space occupied by the buildings.

Figure 13A:
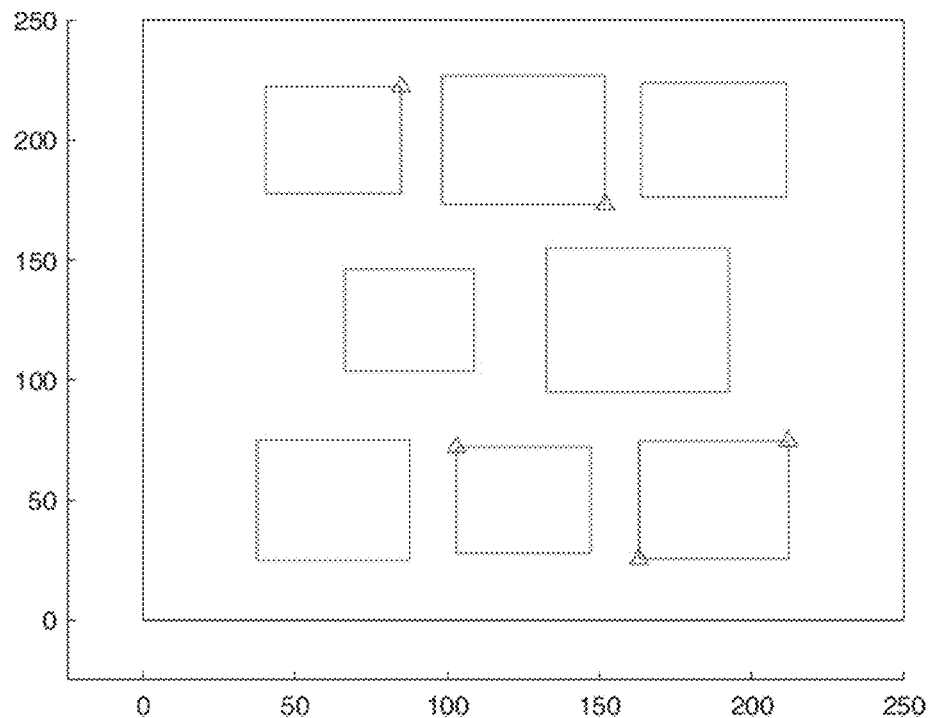
FIG. 13A and FIG. 13B are exemplary diagrams of simulated urban environments.
Figure 13B:
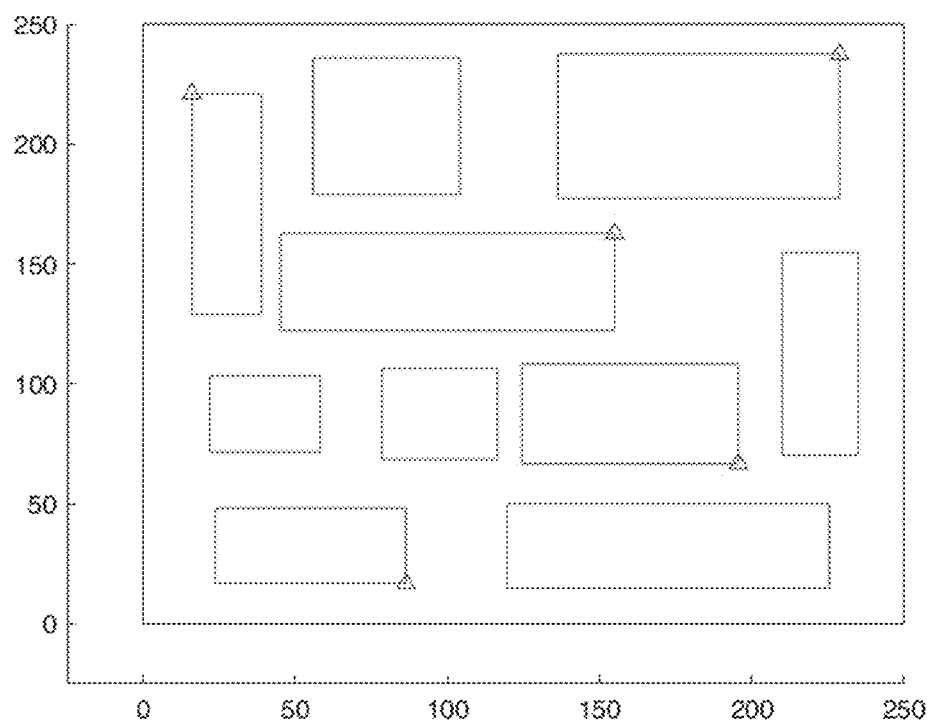
Figure 14A:
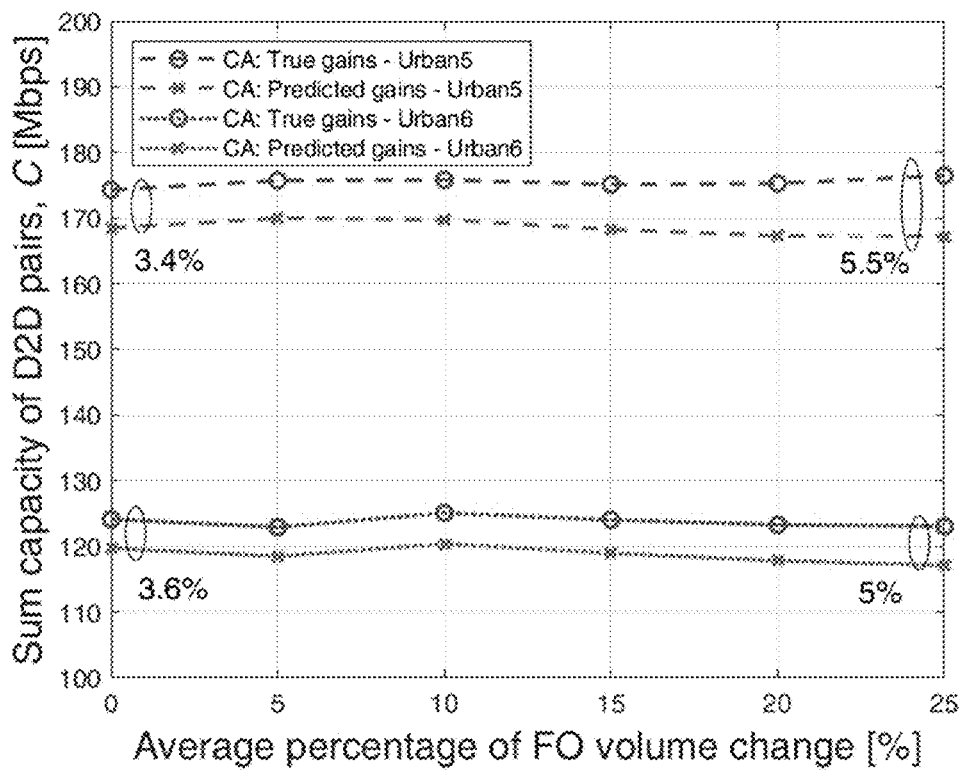
FIG. 14A and FIG. 14B are graphs of sum capacity of D2D pairs over the average percentage of fixed obstacle volume change.
Figure 14B:
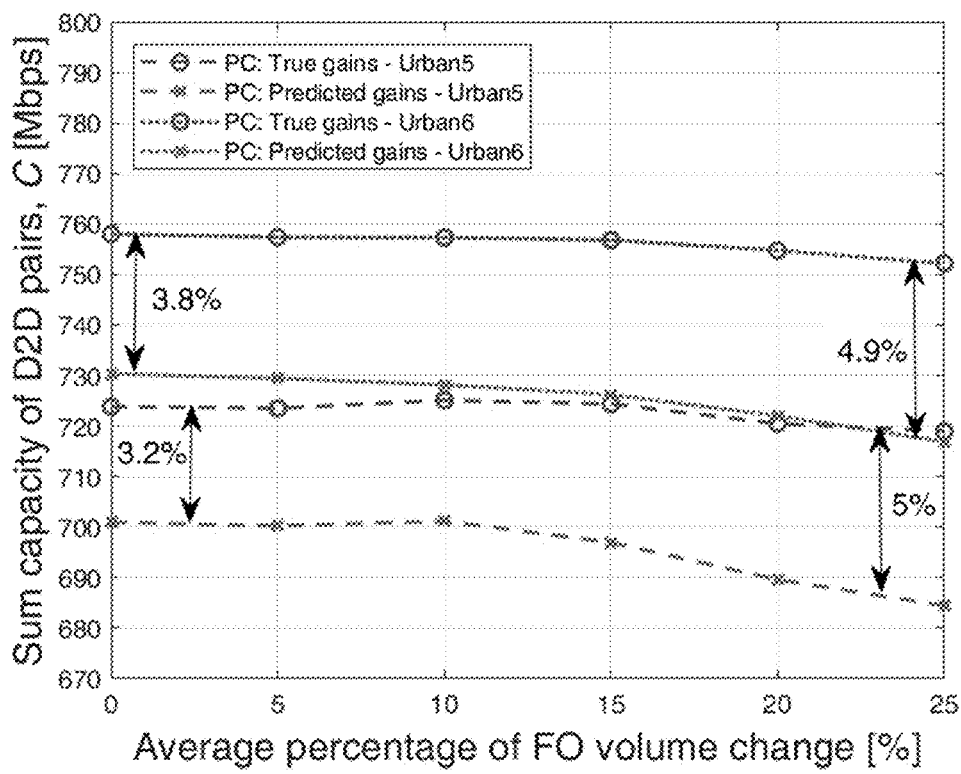

Second, the trained DNN was tested in the urban areas with the dimensions of the buildings (i.e., the fixed obstacles, FOs) changed, as shown in FIG. 13A and FIG. 13B. In this evaluation, the volume of every FO was allowed to either increase (the probability of this was set to 0.5) or decrease (the probability of this was also set to 0.5). Then, the percentage of the changes in the volume of every FO was randomly generated so that the average change in the FOs' volume was fixed and corresponded to the targeted value of the change in order to present the results in the figures (i.e., the x axis in FIG. 14A and FIG. 14B represents the average change in the volumes of the FOs). The average percentage of FO's change was up to 25% and, without loss of generality, the change in the volume of any FO was divided equally over its three dimensions (i.e., length, width, and height). For example, if the FO's volume decreased by 25%, each dimension of the FO was decreased by approximately 9%. FIG. 13A shows the Urban5 environment (based on Urban1) and FIG. 13B shows the Urban6 environment (based on Urban2).

FIG. 14A and FIG. 14B show the effect of the changes in the volumes of the FOs on the channel allocation algorithm from Mach, et al. discussed above and the binary power control algorithm from Gjendemsjo, et al. in both urban areas and with four D2D pairs. Similar to the MOs scenario in FIG. 11A and FIG. 11B, the sum capacity reached when the proposed prediction scheme was exploited modestly decreased comparing to the case when the D2D true channel gains were known. This decrease was slightly more notable for larger changes in the volumes of the FOs as expected. However, the capacity decrease induced by the FOs' volume changes was only up to 2.1% (5.5%-3.4%) and 1.4% (5%-3.6%) in the case of channel allocation (FIG. 14A) for the Urban5 and Urban6 environments when compared to the Urban1 and Urban2 environments, respectively. Similarly, the power control (FIG. 14B) was affected only negligibly by up to only 1.8% (5%-3.2%) and 1.1% (4.9%-3.8%) for the Urban5 and Urban6 environments when compared to the Urban1 and Urban2 environments, respectively. Comparing the sensitivity of the Urban1 and Urban2 areas to the changes in the volume of FOs, it can be seen that the Urban1 area was slightly more sensitive to the changes in the FOs' volumes. This was, however, expected due to the higher influence of the channel estimation noise on the Urban1 area, which is a result of the higher LOS probability compared to the Urban2 area as explained for the MOs.

These encouraging results confirm the robustness of the proposed prediction scheme against the changes in the real-world environment and the potential inaccuracies in the training phase.

In the disclosed experimental example, a novel D2D channel gains prediction scheme was demonstrated based on the base station channel gains between the UEs and multiple BSes. The disclosed prediction scheme takes advantage of the network topology-related correlation between the cellular and D2D channel gains. A supervised learning-based approach exploiting deep neural networks was implemented to extract the mapping between the base station channel gains of any pair of the UEs (i.e., gains of channels between the two UEs in the pair and multiple BSes) and the gain of the D2D channel between these two UEs. The proposed prediction scheme achieved a high Pearson correlation coefficient between the true and the predicted D2D channel gains. In addition, he proposed prediction scheme was shown to significantly reduce the networks' signaling (represented by channel state information) overhead when applied to realistic radio resource management algorithms. This saving of the channel information is at the cost of only negligible performance losses in terms of communication capacity comparing to the conventional implementation of these algorithms with knowledge of all channels. It was also demonstrated that the disclosed system is robust and resilient to possible changes in the environment induced by various moving obstacles or potential changes in the fixed obstacles (e.g., the buildings) that exist in the area.

The following publications are incorporated herein by reference:

M. N. Tehrani, et al., "Device-to-Device Communication in 5G Cellular Networks: Challenges, Solutions, and Future Directions," *IEEE Communications Magazine*, 52(5), pp. 86-92, 2014.

P. Mach, et al., "In-band Device-to-Device Communication in OFDMA Cellular Networks: A Survey and Challenges," *IEEE Communications Surveys & Tutorials*, vol. 17, no. 4, pp. 1885-1922, 2015.

P. Mach, Z. Becvar, and M. Najla, "Combined Shared and Dedicated Resource Allocation for D2D communication," accepted to *IEEE VTC-Spring*, 2018.

F. H. Khan, Y. J. Choi, and S. Bahk, "Opportunistic Mode Selection and RB Assignment for D2D Underlay Operation in LTE Networks," *IEEE 79th Vehicular Technology Conference (VTC Spring)*, pp. 1-5, 2014.

Y. Huang, et al., "Mode Selection, Resource Allocation, and Power Control for D2D-Enabled Two-Tier Cellular Network," *IEEE Transactions on Communications*, 64(8), pp. 3534-3547, 2016.

J. Kim, S. Kim, J. Bang, and D. Hong, "Adaptive Mode Selection in D2D Communications Considering the Bursty Traffic Model," *IEEE Communications Letters*, 20(4), 712-715, 2016.

D. Ma, N. Wang, and X. Mu, "Resource Allocation for Hybrid Mode Device-to-Device Communication Networks," *IEEE WCSP*, 2016.

Y. Li, M. C. Gursoy, and S. Velipasalar, "Joint Mode Selection and Resource Allocation for D2D Communications under Queueing Constraints," *IEEE Infocom Workshop*, 2016.

F. Jiang, et al., "Mode Selection and Resource Allocation for Device-to-Device Communications in 5G Cellular Networks," *China Communications*, 13(6), 32-47, 2016

S. Shamaei, et al., "Interference Management in D2D-Enabled Heterogeneous Cellular Networks Using Matching Theory," *IEEE Transactions on Mobile Computing*, 18(9), pp. 2091-2102, 2018.

S. M. A. Kazmi, et al., "Mode selection and Resource Allocation in Device-to-Device Communications: A Matching Game Approach," *IEEE Transactions on Mobile Computing*, 16(11), pp. 3126-3141, 2017.

T. Huynh, at al., "Joint Downlink and Uplink Interference Management for Device-to-Device Communication Underlaying Cellular Networks," *IEEE Access*, 4, pp. 4420-4430, 2016.

Y. Gu, et al., "Matching and Cheating in Device-to-Device Communications Underlaying Cellular Networks," *IEEE Journal on Selected Areas in Communications*, 33(10), pp. 2156-2166, 2015.

R. Wang, et al. "Qos-Aware Joint Mode Selection and Channel Assignment for D2D Communications," *IEEE International Conference on Communications (ICC)*, pp. 1-6, 2016.

R. AliHemmati, et al., "Power Allocation for Underlay Device-to-Device Communication over Multiple Channels," *IEEE Transactions on Signal and Information Processing over Networks*, 4(3), pp. 467-480, 2018.

R. AliHemmati, et al., "Multi-Channel Resource Allocation Toward Ergodic Rate Maximization for Underlay Device-to-Device Communications," *IEEE Transactions on Wireless Communications*, 17(2), pp. 1011-1025, 2018.

Y. Qian, T. Zhang, and D. He, "Resource Allocation for Multichannel Device-to-Device Communications Underlying QoS-Protected Cellular Networks," *IET Communications*, 11(4), pp. 558-565, 2017.

R. Yin, et al., "Joint Spectrum and Power Allocation for D2D Communications Underlaying Cellular Networks," *IEEE Transactions on Vehicular Technology*, 65(4), pp. 2182-2195, 2016.

W. Lee, et al., "Deep power control: Transmit power control scheme based on convolutional neural network," *IEEE Communications Letters*, 22(6), pp. 1276-1279, 2018.

P. Mach, Z. Becvar, and M. Najla, "Resource Allocation for D2D Communication with Multiple D2D Pairs Reusing Multiple Channels," *IEEE Wireless Communications Letters*, 8(4), pp. 1008-1011, 2019.

A. Gjendemsjo, et al., "Binary Power Control for Sum Rate Maximization Over Multiple Interfering Links," *IEEE Trans. on Wireless Commun.*, 7(8), pp. 3164-3173, 2008.

K. Hugl, et al., "Downlink Beamforming Avoiding DOA Estimation for Cellular Mobile Communications," *IEEE International Conference on Acoustics, Speech, and Signal Processing*, 6, pp. VI-3313, 1998

T. Aste, et al., "Downlink Beamforming for Frequency Division Duplex Systems," *IEEE Global Communications Conference (GLOBECOM)*, 4, pp. 2097-2101, 1999.

Y. C. Liang, et al., "Downlink Channel Covariance Matrix (DCCM) Estimation and Its Applications in Wireless DS-CDMA Systems," *IEEE Journal on Selected Areas in Communications,* 19(2), pp. 222-232, 2001.

K. Hugl, et al., "Spatial Reciprocity of Uplink and Downlink Radio Channels in FDD Systems," *Proc. COST,* 273(2), p. 066, 2002.

B. K. Chalise, et al., "Robust Uplink to Downlink Spatial Covariance Matrix Transformation for Downlink Beamforming," *IEEE International Conference on Communications,* 5, pp. 3010-3014, 2004.

M. Jordan, et al., "Conversion of the Spatio-Temporal Correlation from Uplink to Downlink in FDD Systems," *IEEE Wireless Communications and Networking Conference,* pp. 1-6, 2009.

M. Arnold, et al., "Enabling FDD Massive MIMO through Deep Learning-based Channel Prediction," *arXiv preprint arXiv:* 1901.03664, pp. 1-6, 2019.

N. Gonza'lez-Prelcic, et al., "Millimeter-Wave Communication With Out-of-Band Information," *IEEE Communications Magazine,* 55(12), pp. 1038-1052, 2017.

A. Ali, et al., "Millimeter Wave Beam-Selection Using Out-of-Band Spatial Information," *IEEE Transactions on Wireless Communications,* 17(2), pp. 140-146, 2017.

A. Ali, et al., "Estimating Millimeter Wave Channels Using Out-of-Band Measurements," *Information Theory and Applications Workshop,* pp. 1-6, 2016.

R. Deng, et al., "A Two-Step Learning and Interpolation Method for Location-based Channel Database Construction," *IEEE Global Communications Conference (GLOBECOM),* pp. 1-6, 2018.

P. Dong, et al., "Machine Learning Prediction Based CSI Acquisition for FDD Massive MIMO Downlink," *IEEE Global Communications Conference (GLOBECOM),* pp. 1-6, 2018.

M. Najla, et al., "Machine Learning for Power Control in D2D Communication based on Cellular Channel Gains," in *IEEE Global Communications Conference Workshop on Machine Learning for Wireless Communications,* 2019.

X. Li, et al., "Resource allocation for underlay D2D communication with proportional fairness," *IEEE Transactions on Vehicular Technology,* 67(7), pp. 6244-6258, 2018.

S. Lin, et al., "Sum-rate optimization for Device-to-Device communications over Rayleigh fading channel," *IEEE VTC Spring,* pp. 1-6, 2017.

Z. Chu, et al., "Low-Latency Driven Energy Efficiency for D2D Communications," *IEEE ICC,* pp. 1-6, 2019.

R. AliHemmati, et al., "Multi-Channel Resource Allocation Toward Ergodic Rate Maximization for Underlay Device-to-Device Communications," *IEEE Transactions on Wireless Communications,* 17 (2), pp. 1011-1025, 2017.

D. Astely, et al., "LTE: The Evolution of Mobile Broadband," *IEEE Communications Magazine,* 47(4), pp. 44-51, 2009.

3GPP TS 36.211, "Evolved Universal Terrestrial Radio Access (E-UTRA); Physical channels and modulation," v13.5.0, Release 13, 2017.

P. Mach, et al., "Mobile Edge Computing: A Survey on Architecture and Computation Offloading," *IEEE Communications Surveys & Tutorials,* 19(3), pp. 1628-1656, 2017.

D. M. Hawkins, "The Problem of Overfitting," *Journal of chemical information and computer sciences,* 44(1), pp. 1-12, 2004.

D. Marquardt, "An Algorithm for Least-Squares Estimation of Nonlinear Parameters," *SIAM Journal on Applied Mathematics,* 11(2), pp. 431-441, 1963.

M. T. Hagan, "Training Feed-Forward Networks With The Marquardt Algorithm," *IEEE Transactions on Neural Networks,* 5(6), pp. 989-993, 1994.

L. Melki et al., "Interference Management Scheme for Network-Assisted Multi-Hop D2D Communications," *IEEE PIMRC,* pp. 1-5, 2016.

T. D. Hoang et al., "Energy-Efficient Resource Allocation for D2D Communications in Cellular Networks," *IEEE Transactions on Vehicular Technology,* 65(9), pp. 6972-6986, 2016.

Y D. Bultitude et al., "T. IST-4-027756 WINNER II D1. 1.2 V1. 2 WINNER II Channel Models," Tech. Rep., Tech. Rep. 2007.

3GPP TR 36.843, "Study on LTE Device to Device Proximity Services; Radio Aspects," v12.0.1, Release 12, 2014.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method for device-to-device communication, comprising:
    providing a first communication device, a second communication device, and a plurality of base stations;
    measuring a first set of base station channel gains from the first communication device, the first set of base station channel gains corresponding to a first subset of the plurality of base stations;
    measuring a second element of data from the second communication device;
    providing the first set of base station channel gains and the second element of data as inputs to an algorithm;
    calculating a D2D channel gain from the first set of base station channel gains and the second element of data with the machine learning algorithm;
    adjusting at least one parameter based on the calculated D2D channel, the parameter selected from the group consisting of transmit power, an interference management parameter, scheduling, modulation, coding scheme selection, handover decision, or relay selection; and
    initiating communication between the first and second communication devices.

2. The method of claim 1, wherein the second element of data comprises the location of the second communication device.

3. The method of claim 1, wherein the second element of data comprises a second set of base station channel gains corresponding to a second subset of the plurality of base stations.

4. The method of claim 1, further comprising transmitting the first set of base station channel gains and the second element of data to a computation server.

5. The method of claim 1, wherein the algorithm is a machine learning algorithm.

6. The method of claim 5, wherein the machine learning algorithm is executed on a processor of a computation server.

7. The method of claim 5, wherein the machine learning algorithm is a deep neural network.

8. The method of claim 7, wherein the deep neural network has between 4 and 6 hidden layers.

9. The method of claim 1, further comprising the steps of:
providing a first updated set of base station channel gains as an input to the algorithm after a fixed time interval;
providing a second updated element of data as an input to the algorithm after the fixed time interval;
recalculating the D2D channel gain from the first updated set of base station channel gains and the second updated element of data with the algorithm; and
initiating communication between the first and second communication devices using the recalculated D2D channel.

10. The method of claim 9, wherein the fixed time interval is less than 100 ms.

11. The method of claim 1, further comprising using the calculated D2D channel gain for a communication management task selected from the group consisting of radio resource management, network resource management, radio link control, or mobility management.

12. A system for controlling device-to-device communication, comprising:
at least one base station connected to a communication network;
a computing device communicatively connected to the communication network, the computing device comprising a processor and a non-transitory computer-readable medium with instructions stored thereon, which when executed by the processor perform steps comprising:
receiving a first set of base station channel gains from a first communication device;
receiving a second element of data from a second communication device;
providing the first set of base station channel gains and the second element of data as an input to an algorithm;
calculating a D2D channel gain from the input with the algorithm; and
providing the D2D channel gain to a second computing device configured to manage radio resources of the communication network.

13. The system of claim 12, wherein the second element of data comprises the location of the second communication device.

14. The system of claim 12, wherein the second element of data comprises a second set of base station channel gains corresponding to a second subset of the plurality of base stations.

15. The system of claim 12, wherein the computing device is selected from the group consisting of the first communication device and the second communication device.

16. The system of claim 12, wherein the computing device is further connected to at least one additional base station in the communication network.

17. The system of claim 12, wherein the algorithm is a machine learning algorithm.

18. The system of claim 17, wherein the machine learning algorithm is a deep neural network.

19. The system of claim 18, wherein the deep neural network has between 4 and 6 hidden layers.

20. The system of claim 12, the instructions further performing the steps of:
receiving at least one additional set of base station channel gains from at least one additional communication device;
determining at least one additional D2D pair of communication devices, selected from the first, second, and at least one additional communication devices;
providing data selected from the group consisting of the first and at least one additional base station channel gains and the second element of data as a second input to the algorithm;
calculating a second D2D channel gain with the algorithm; and
providing the second D2D channel gain to the second computing device.

21. The system of claim 12, wherein the communication network is a cellular communication network selected from the group consisting of a WiFi, Bluetooth, a 3G, 4G, and 5G cellular network.

22. The system of claim 12, wherein the second computing device is selected from the group consisting of a base station, a UE, a server, a cloud server, and an edge server.

23. A method of training a machine learning algorithm, comprising:
providing a first computing device;
providing a first communication device, a second communication device, and a plurality of base stations;
measuring a first set of base station channel gains from the first communication device, the first set of base station channel gains corresponding to a first subset of the plurality of base stations;
measuring a second set of base station channel gains from the second communication device, the second set of base station channel gains corresponding to a first subset of the plurality of base stations;
collecting first and second sets of base station channel gains from first and second communication devices;
providing a target channel gain between the first and second communication devices; and
training a machine learning algorithm on the first computing device with the base station channel gains and the target channel gain.

24. The method of claim 23, further comprising:
creating a digital representation of a target area, including locations of a plurality of simulated base stations;
selecting two random points in the digital representation of the target area as the locations of first and second simulated communication devices;
calculating simulated base station channel gains for each of the first and second simulated communication devices from the plurality of simulated base stations;
calculating a simulated optimal channel gain between the first and second simulated communication devices; and
providing the first and second simulated base station channel gains and the simulated optimal channel selection as the base station channel gains and the target channel gain, respectively, to train the machine learning algorithm.

25. The method of claim 23, further comprising:
measuring first and second sets of base station channel gains observed by the first and second communication devices;
communicatively connecting the first and second communication devices in D2D communication using a D2D channel; and
providing the first and second measured sets of base station channel gains and the D2D channel as the base station channel gains and target channel gain, respectively, to train the machine learning algorithm.

26. The method of claim 23, further comprising forming a first (sample, result) pair from the simulated base station channel gains and the target channel selection;

calculating a set of additional (sample, result) pairs from a plurality of additional simulated communication devices having locations at other random points in the digital representation; and training the machine learning algorithm with the set of additional (sample, result) pairs.

* * * * *